(12) United States Patent
Patel et al.

(10) Patent No.: US 8,958,838 B2
(45) Date of Patent: Feb. 17, 2015

(54) MULTI-STAGE TRANSMIT POWER CONTROL SCHEME FOR ACCESS POINT

(75) Inventors: Chirag Sureshbhai Patel, San Diego, CA (US); Mehmet Yavuz, San Diego, CA (US); Leonard Henry Grokop, San Diego, CA (US); Vinay Chande, San Diego, CA (US); Sanjiv Nanda, Ramona, CA (US); Farhad Meshkati, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 13/024,918

(22) Filed: Feb. 10, 2011

(65) Prior Publication Data

US 2012/0142392 A1 Jun. 7, 2012

Related U.S. Application Data

(60) Provisional application No. 61/304,252, filed on Feb. 12, 2010.

(51) Int. Cl.
*H04W 52/04* (2009.01)
*H04W 52/24* (2009.01)
(Continued)

(52) U.S. Cl.
CPC ........... *H04W 52/245* (2013.01); *H04W 28/18* (2013.01); *H04W 52/143* (2013.01);
(Continued)

(58) Field of Classification Search
CPC . H04W 28/18; H04W 52/143; H04W 52/242; H04W 52/243; H04W 52/247; H04W 52/281; H04W 52/325; H04W 52/50; H04W 52/16; H04W 52/22; H04W 52/221; H04W 52/228; H04W 52/26

USPC .......... 455/69, 522, 67.16, 67.13, 67.11, 512, 455/504, 13.4, 9, 115.1, 115.3, 135, 226.2, 455/277.2, 423, 444; 370/338, 343
See application file for complete search history.

(56) References Cited

U.S. PATENT DOCUMENTS 6,556,551 B1 4/2003 Schwartz
8,018,930 B2 9/2011 Casaccia et al.
(Continued)

FOREIGN PATENT DOCUMENTS

CN 101517964 A 8/2009
GB 2450123 12/2008
(Continued)

OTHER PUBLICATIONS

International Search Report and Written Opinion—PCT/US2011/024696-ISA/EPO—May 23, 2011.
(Continued)

*Primary Examiner* — Tan Trinh

(57) ABSTRACT

Transmit power for an access point is controlled based on information received by the access point. For example, an access point may employ one or more algorithms that use messages received from nearby access terminals to maintain an acceptable tradeoff between providing an adequate coverage area for access point transmissions and mitigating interference that these transmissions cause at nearby access terminals. Here, the access point may employ a network listen-based algorithm upon initialization of the access terminal to provide preliminary transmit power control until sufficient information is collected for another transmit power control algorithm (e.g., an access terminal assisted algorithm). Also, the access terminal may employ an active access terminal protection scheme to mitigate interference the access point may otherwise cause to a nearby access terminal that is in active communication with another access point.

35 Claims, 17 Drawing Sheets

(51) Int. Cl.
*H04W 52/14* (2009.01)
*H04W 28/18* (2009.01)
*H04W 52/28* (2009.01)
*H04W 52/32* (2009.01)
*H04W 52/50* (2009.01)
*H04W 72/08* (2009.01)
*H04W 84/04* (2009.01)

(52) U.S. Cl.
CPC .......... *H04W52/242* (2013.01); *H04W 52/243* (2013.01); *H04W 52/247* (2013.01); *H04W 52/281* (2013.01); *H04W 52/325* (2013.01); *H04W 52/50* (2013.01); *H04W 72/085* (2013.01); *H04W 84/045* (2013.01)
USPC .................. 455/522; 455/67.11; 455/67.13; 455/444; 370/338

(56) References Cited

U.S. PATENT DOCUMENTS

| | | | |
|---|---|---|---|
| 8,032,142 B2 | 10/2011 | Carter et al. | |
| 8,050,629 B2 | 11/2011 | Foster et al. | |
| 8,200,239 B2 | 6/2012 | Mia et al. | |
| 8,295,874 B2* | 10/2012 | Harris et al. | 455/522 |
| 8,452,282 B2 | 5/2013 | Masuda et al. | |
| 8,761,060 B2* | 6/2014 | Patel et al. | 370/310 |
| 2004/0009749 A1 | 1/2004 | Arazi et al. | |
| 2007/0042799 A1* | 2/2007 | Jubin et al. | 455/522 |
| 2007/0140185 A1* | 6/2007 | Garg et al. | 370/338 |
| 2007/0268837 A1 | 11/2007 | Melton et al. | |
| 2007/0270151 A1 | 11/2007 | Claussen et al. | |
| 2008/0146154 A1* | 6/2008 | Claussen et al. | 455/63.1 |
| 2009/0122717 A1* | 5/2009 | Das et al. | 370/253 |
| 2009/0323663 A1 | 12/2009 | Nakatsugawa | |
| 2010/0008258 A1 | 1/2010 | Ji et al. | |
| 2010/0048212 A1 | 2/2010 | Yavuz et al. | |
| 2010/0273432 A1 | 10/2010 | Meshkati et al. | |
| 2010/0273471 A1 | 10/2010 | Meshkati et al. | |
| 2010/0273473 A1 | 10/2010 | Meshkati et al. | |
| 2010/0273481 A1 | 10/2010 | Meshkati et al. | |
| 2011/0136490 A1 | 6/2011 | Aoyagi | |
| 2011/0159914 A1* | 6/2011 | Chen et al. | 455/522 |
| 2011/0170432 A1* | 7/2011 | Grokop et al. | 370/252 |
| 2011/0177808 A1* | 7/2011 | Grokop et al. | 455/423 |
| 2011/0275361 A1* | 11/2011 | Yavuz et al. | 455/422.1 |
| 2012/0039265 A1* | 2/2012 | Patel et al. | 370/329 |
| 2012/0046026 A1* | 2/2012 | Chande et al. | 455/422.1 |
| 2012/0046063 A1* | 2/2012 | Chande et al. | 455/522 |
| 2012/0238302 A1* | 9/2012 | Pedersen et al. | 455/501 |
| 2012/0252453 A1 | 10/2012 | Nagaraja et al. | |
| 2013/0223377 A1* | 8/2013 | Doppler et al. | 370/329 |
| 2014/0135004 A1 | 5/2014 | Patel et al. | |

FOREIGN PATENT DOCUMENTS

| | | |
|---|---|---|
| JP | 2010016420 A | 1/2010 |
| JP | 2010518668 A | 5/2010 |
| KR | 100469245 B1 | 2/2005 |
| WO | WO-06039681 | 4/2006 |
| WO | WO2008093100 | 8/2008 |
| WO | WO-2009049195 A1 | 4/2009 |
| WO | WO 2009/152978 * | 6/2009 |
| WO | WO-2009123235 A1 | 10/2009 |
| WO | WO-2009145302 A1 | 12/2009 |
| WO | WO-2009152978 A1 | 12/2009 |

OTHER PUBLICATIONS

International Search Report and Written Opinion—PCT/US2011/024698-ISA/EPO—May 23, 2011.
Taiwan Search Report—TW100104622—TIPO—Dec. 14, 2013 (101006U2TW).

* cited by examiner

MULTI-STAGE TRANSMIT POWER CONTROL SCHEME FOR ACCESS POINT

CLAIM OF PRIORITY

This application claims the benefit of and priority to commonly owned U.S. Provisional Patent Application No. 61/304,252, filed Feb. 12, 2010, the disclosure of which is hereby incorporated by reference herein.

CROSS-REFERENCE TO RELATED APPLICATION

This application is related to concurrently filed and commonly owned U.S. patent application Ser. No. 13/024,893, entitled "CONTROLLING ACCESS POINT TRANSMIT POWER BASED ON RECEIVED ACCESS TERMINAL MESSAGES," the disclosure of which is hereby incorporated by reference herein.

BACKGROUND

1. Field

This application relates generally to wireless communication and more specifically, but not exclusively, to controlling access point transmit power.

2. Introduction

A wireless communication network may be deployed over a geographical area to provide various types of services (e.g., voice, data, multimedia services, etc.) to users within that geographical area. In a typical implementation, macro access points (e.g., each of which provides service via one or more cells) are distributed throughout a macro network to provide wireless connectivity for access terminals (e.g., cell phones) that are operating within the geographical area served by the macro network.

As the demand for high-rate and multimedia data services rapidly grows, there lies a challenge to implement efficient and robust communication systems with enhanced performance. To supplement conventional network access points (e.g., to provide extended network coverage), small-coverage access points (e.g., low power access points) may be deployed to provide more robust indoor wireless coverage or other coverage to access terminals inside homes, enterprise locations (e.g., offices), or other locations. Such small-coverage access points may be referred to as, for example, femto cells, femto access points, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

When a femto cell is deployed on a carrier frequency that is different from the carrier frequencies used by neighboring macro cells, the femto cell may radiate beacons on the macro cell carrier frequencies. In this way, the femto cell may attract an access terminal that is in the vicinity of the femto cell to the femto cell coverage (i.e., cause the access terminal to move off of the macro cell coverage). Thus, through the use of this beacon scheme, a user coming home (e.g., approaching a home femto cell) from outside the coverage of the femto cell will be able to readily discover the femto cell and obtain service from the femto cell. Though such beacons are useful in terms of femto cell discovery, they may create interference on the macro network since the beacons are transmitted on the same carrier frequency that is used by neighboring macro cells. This interference may affect the voice call quality of active macro cell users (i.e., users actively receiving service from one or more macro cells on a macro cell frequency) and may also lead to call drops if the macro cell user happens to be very close to the femto cell. Similar macro network interference issues may arise in a co-channel deployment due to femto cell forward link transmissions. Therefore, there is a need to protect active macro cell users from interference from femto cells while still providing adequate coverage at a femto cell.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to controlling transmit power of an access point. For example, the disclosed techniques may be employed to control beacon channel transmit power and/or forward link (e.g., service channel) transmit power of a femto cell. In such a case, transmit power may be controlled on one or more beacon carrier frequencies (e.g., macro frequencies) and/or on a femto forward link (FL) carrier frequency. Here, controlling the transmit power may include, for example, setting transmit power limits and/or setting a transmit power value.

The disclosure relates in some aspects to multi-stage transmit power control schemes for an access point. For example, a network listen-based algorithm may be employed when the access terminal is initialized (e.g., upon power-up), after which a more robust algorithm (e.g., an access terminal assisted algorithm) may be employed to provide a better tradeoff between having an adequate coverage area for the access point and mitigating interference to nearby access terminals. In addition, an active access terminal protection scheme may be employed (e.g., on a continual basis) to mitigate interference the access point may otherwise induce at a nearby access terminal that is in active communication with another access point.

In some aspects, a network listen-based algorithm may involve: maintaining information indicative of a desired coverage range for an access point; receiving signals on a carrier frequency, wherein the signals are received from at least one other access point that transmits on at least one forward link on the carrier frequency; determining signal strength information associated with the received signals; setting transmit power limits for a transmit power algorithm based on the determined signal strength information and the maintained coverage range information; and controlling transmit power of the access point according to the transmit power algorithm.

In some aspects, an access terminal assisted algorithm may be based on messages that the access point receives from nearby access terminals. The messages may comprise, for example, measurement reports and/or registrations messages.

In some aspects, an access terminal assisted algorithm that employs measurement report-type messages may involve: transmitting data on a forward link and optionally transmitting beacons on a beacon channel, wherein the forward link data is transmitted on a first carrier frequency and the beacons are transmitted on a second carrier frequency; receiving messages from at least one access terminal, wherein the messages are indicative of channel quality on the first carrier frequency and/or the second carrier frequency (and/or wherein the messages include path loss information); and controlling transmit power of the access point based on the received messages, wherein the transmit power is controlled for transmissions on the first carrier frequency and/or the second carrier frequency.

In some aspects, an access terminal assisted algorithm that employs registration-type messages may involve: transmitting data on a forward link and optionally transmitting beacons on a beacon channel, wherein the forward link data is transmitted on a first carrier frequency and the beacons are transmitted on a second carrier frequency; receiving registration messages from at least one access terminal (e.g., a preferred access terminal such as a home access terminal or a non-preferred access terminal such as an access terminal that is not authorized to access active mode service via the access point), wherein the registration messages are triggered due to detection of beacons on the second carrier frequency or detection of signals on the forward link by the at least one access terminal; and controlling transmit power on the first carrier frequency and/or the second carrier frequency based on the received registration messages.

BRIEF DESCRIPTION OF THE DRAWINGS

These and other sample aspects of the disclosure will be described in the detailed description and the appended claims that follow, and in the accompanying drawings, wherein:

Figure 1:
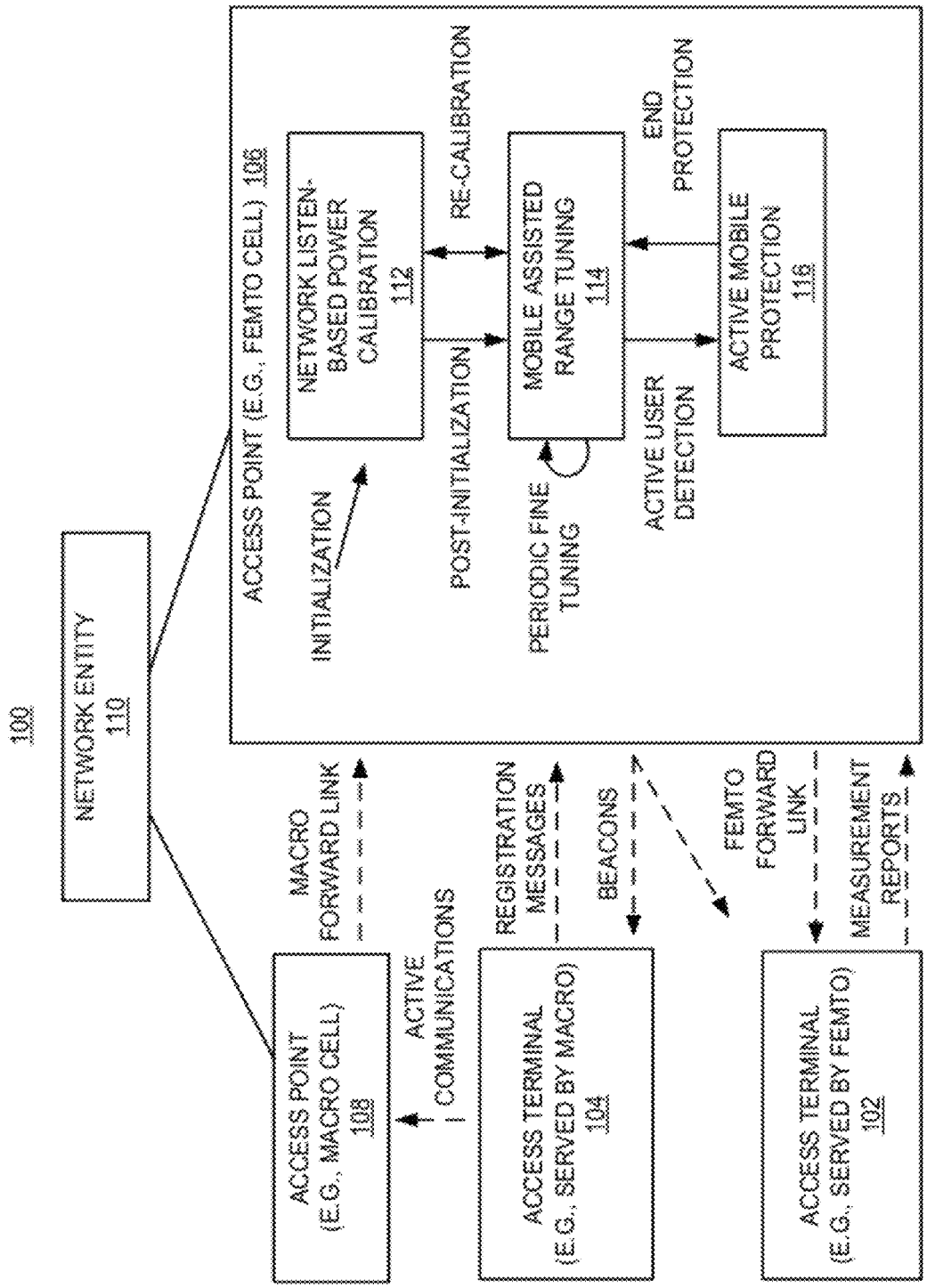
FIG. 1 is a simplified block diagram of several sample aspects of a communication system wherein an access point controls its transmit power based on received information.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, home NodeBs, home eNodeBs, macro cells, femto cells, and so on, while access terminals may be referred to or implemented as user equipment (UEs), mobiles, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, or some access point in the system 100 (not shown).

Certain types of access points (e.g., femto cells) may be configured to support different types of access modes. For example, in an open access mode, an access point may allow any access terminal to obtain any type of service via the access point. In a restricted (or closed) access mode, an access point may only allow authorized access terminals to obtain service via the access point. For example, an access point may only allow access terminals (e.g., so called home access terminals) belonging to a certain subscriber group (e.g., a closed subscriber group (CSG)) to obtain service via access point. In a signaling-only (or hybrid) access mode, alien access terminals (e.g., non-home access terminals, non-CSG access terminals) may only be allowed to obtain signaling access via the access point. For example, a macro access terminal that does not belong to a femto cell's CSG may be allowed to perform certain paging, registration, and other signaling operations at the femto cell, but may not be allowed to obtain active mode service via the femto cell.

Each of the access points may communicate with one or more network entities (represented, for convenience, by a network entity 110) to facilitate wide area network connectivity. These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. Also, two of more of these network entities may be co-located and/or two or more of these network entities may be distributed throughout a network.

The access point 106 (e.g., a femto cell) provides service for nearby access terminals through the use of a service channel that operates on a designated carrier frequency. In some cases (e.g., co-channel deployments), this carrier frequency may be used by different types of access points (e.g., femto cells and macro cells). In other cases, different types of access points may operate on different carrier frequencies. For example, femto cells may deploy their service channels on a dedicated femto carrier frequency, while macro cells may deploy their service channels on one or more macro carrier frequencies. In the latter case, a femto cell may transmit beacons on each macro carrier frequency to enable nearby access terminals operating on that carrier frequency to find the femto cell. Thus, in either a co-channel or a non-co-channel deployment scenario, transmissions by a femto cell on a given carrier frequency may interfere with signal reception at a nearby access point that is in active communication with another access point (e.g., a macro cell or another femto cell).

The potentially interfering transmissions by an access point may take various forms. For example, in a co-channel deployment, a femto cell's forward link transmissions (e.g., for the service channel) may cause interference at nearby macro access terminals operating on the same carrier frequency. As another example, in a deployment where a femto cell transmits beacons on a macro carrier frequency, these beacon transmissions may cause interference at nearby macro access terminals operating on that macro carrier frequency. In some implementations, an access point transmits beacons at different power levels. Here, the access point will normally transmit beacons at a low power level in an attempt to minimize interference caused by the beacons. However, the access point will regularly transmit beacons at a higher power level (or multiple higher levels) for short periods of time to facilitate attracting access terminals from a greater distance.

The access point 106 employs transmit power control to provide a desired area of communication coverage for attracting and/or communicating with access terminals (e.g., the access terminal 102) that are authorized to receive active mode service from the access point 106, while mitigating interference that transmissions by the access point 106 may have on nearby access terminals (e.g., the access terminal 104) that are not authorized to receive active mode service from the access point 106. For example, the access terminal 102 may be a member of a CSG of the access point 106 while the access terminal 104 is not a member of that CSG. In this case, it is desirable for the access point 106 to use sufficient transmit power (e.g., for beacon and/or forward link transmissions) so that the access terminal 102 is able to detect the presence of the access point 106 and/or communicate with the access point 106 from a particular distance (e.g., throughout a building within which the access point 106 is deployed). Conversely, it is preferable that the transmissions by the access point 106 do not unduly interfere with the ability of the access terminal 104 to receive signals from the access point 108 (e.g., a serving macro cell for the access terminal 104).

In accordance with the teachings herein, the access point 106 may employ a multi-stage transmit power control scheme. For example, the access point 106 may jointly employ network listen-based power calibration (NLPC) functionality as represented by the block 112, mobile assisted range tuning (MART) functionality as represented by the block 114, and active mobile protection functionality as represented by the block 116. At any given point in time, transmit power is controlled (e.g., calibrated) depending on the state of the access point 106.

In a sample implementation, these states may comprise an initialization (e.g., power-up or recalibration) state, a post-initialization state, and a state relating to the detection of the presence of an active macro user in the vicinity of the access point 106. For example, when the access point 106 is powered-up, the access point 106 initially uses NLPC.

Subsequently, the access point 106 uses mobile (i.e., access terminal) assisted range tuning. For example, the access point 106 may switch to the MART state after it collects a sufficient amount of information from nearby mobiles. This information may be collected in different ways and may take different forms. For example, at various points in time, the access point 106 will transmit information on its service channel and may also transmit on one or more beacon channels. As a result of these transmissions, the access point 106 may receive messages from nearby access terminals.

In some cases, a nearby access terminal (e.g., the access terminal 102) that is authorized to obtain active mode service via the access point 106 may send measurement report messages to the access point 106. These measurement report messages may thus report the signal power measured at the access terminal 102 for the femto service channel and/or the beacon channel(s). In some cases, the access point 106 may request the access terminal to measure channel quality on the femto service channel and/or the beacon channel(s) and report this information back using measurement report messages. Additionally, in some cases, the access point 106 may request the access terminal to report path loss on the femto service channel and/or the beacon channel and report this information back using measurement report messages.

In addition, in some cases, a nearby access terminal (e.g., the access terminal 104) that is being served by another access point (e.g., the access point 108) or that is in idle mode may attempt to register with the access point 106 as a result of receiving beacons or forward link signals from the access point 106. Consequently, such an access terminal may send registration messages to the access point 106. In some cases, the access point 106 may request that one or more of signal power, quality or path loss to be reported as a part of a registration message from the access terminal 104. As discussed in more detail below, as a result of receiving these messages, the access point 106 may determine how to best adjust its transmit power to provide an acceptable tradeoff between providing adequate coverage and minimizing interference.

In the MART state, the access point 106 may continually (e.g., periodically) update the transmit power. For example, the access point 106 may acquire information from nearby access terminals (e.g., channel quality, received power, and path loss reports from home mobiles and registration statistics of alien access terminals) and then fine tune the transmit power on a periodic basis based on this information.

In addition, while in the MART state, the access point 106 may regularly monitor network conditions to determine whether there has been a significant change in network conditions (e.g., due to a change in femto cell location and/or installation/removal of access points in the vicinity). If so, the access point 106 may switch back to the network listen-based power calibration state to update one or more power control parameters (e.g., transmit power limits). For example, a femto cell may periodically perform network listen measurements and performs recalibration if the RF environment has changed. A change in the RF environment may be detected by comparing previous network listen measurements with the new network listen measurements. If a change is detected, transmit power may be re-calibrated by combining network listen measurements with previously learned information from the home access terminal reports and access terminal registration statistics (e.g., from preferred access terminals and/or from non-preferred access terminal such as alien access terminals). The periodicity of making network listen measurements for recalibration may be smaller than the MART periodicity. Also, recalibration is done under events such as when the access points is re-powered up, when the RF environment has changed, or when the access point is explicitly directed to re-calibrate by the network.

Also, while in the NLPC state or the MART state, the access point 106 may regularly (e.g., continually) monitor for the presence of any nearby active users. For example, a femto cell may monitor for nearby active macro users by measuring out-of-cell interference on one or more reverse link frequencies. In the event a nearby active user is detected on a given carrier frequency, the access point 106 switches to the active mobile protection state. Here, the access point 106 may temporarily limit its transmissions by, for example, reducing transmit power or ceasing transmission on that carrier frequency. Then, upon determining that the user is no longer nearby or is no longer active, the access point 106 returns to the previous state (e.g., NLPC or MART).

From the above, it should be appreciated that while in the NLPC state, the access point 106 may transmit using transmit power parameters determined by an NLPC algorithm. Conversely, while in the MART state, the access point 106 may transmit using transmit power parameters determined by a MART algorithm, whereby the transmit power parameters are based on messages received from at least one access terminal (e.g., a home access terminal). In the MART state, the access point 106 will continue collecting messages from the at least access terminal. In addition, for active mobile protection, the access point 106 may regularly monitor for other access terminals (e.g., active macro access terminals) that may be subject to interference from the access point 106.

Sample operations of the system 100 will now be described in more detail in conjunction with the flowchart of FIGS. 2 and 3. For convenience, the operations of FIGS. 2 and 3 (or any other operations discussed or taught herein) may be described as being performed by specific components (e.g., the components of FIG. 1 and FIG. 8). It should be appreciated, however, that these operations may be performed by other types of components and may be performed using a different number of components. It also should be appreciated that one or more of the operations described herein may not be employed in a given implementation.

Figure 2:
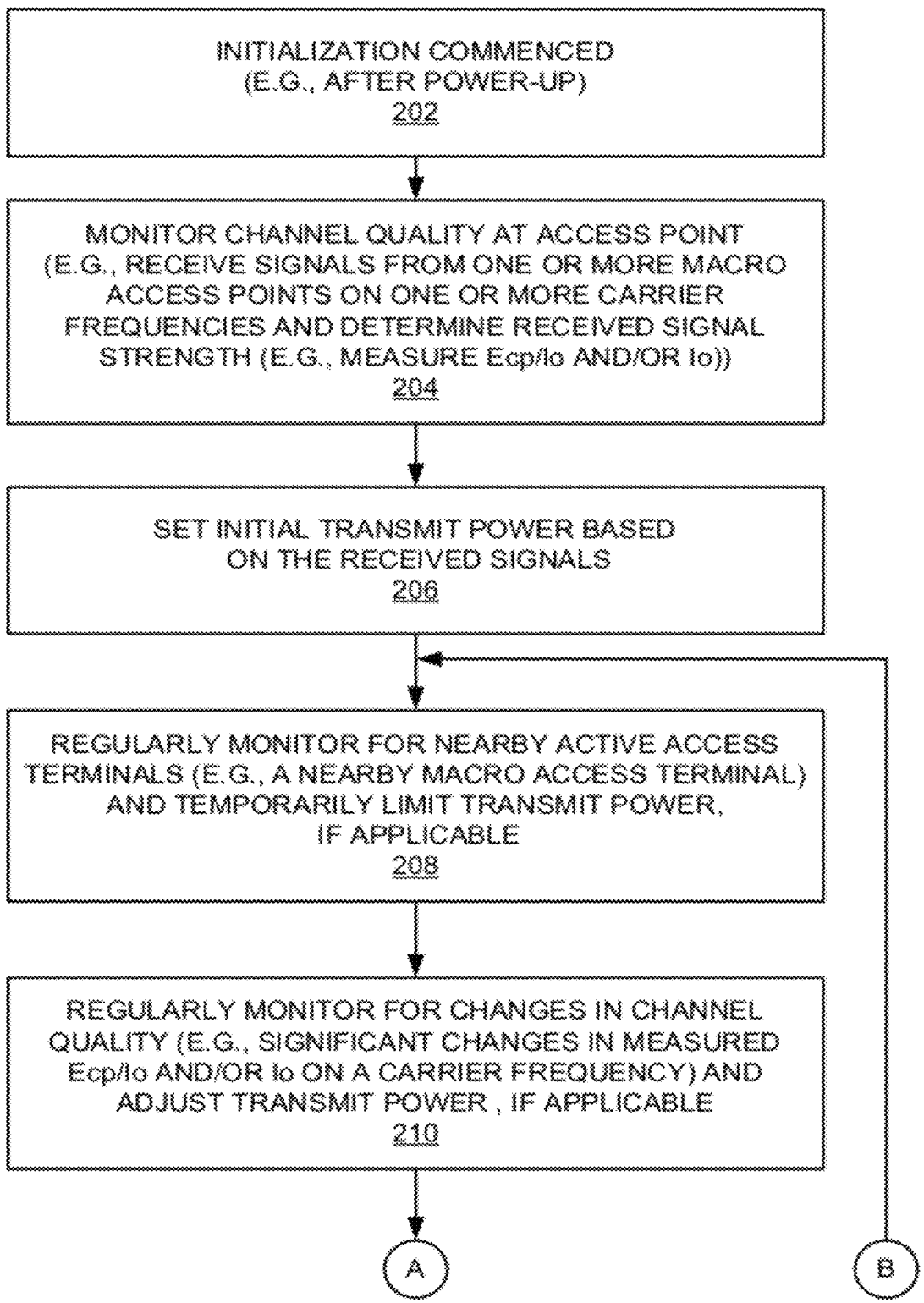
FIGS. 2 and 3 are a flowchart of several sample aspects of operations that may be performed in conjunction with controlling transmit power of an access point.

As represented by block 202 of FIG. 2, initialization of an access point (e.g., a femto cell) is commenced at some point in time. For example, the access point may be powered-up, reset, or subjected to some other procedure that commences initialization of the access point.

As represented by blocks 204 and 206, the access point employs network listen-based power calibration (NLPC) after initialization is commenced. In some aspects, this involves monitoring one or more channels (e.g., on a corresponding carrier frequency) to determine the corresponding channel quality (e.g., received signal strength) as seen by the access point. Here, an underlying assumption of NLPC is that the channel quality (e.g., macro channel quality) measured by the access point is similar to that observed by an access terminal (e.g., a home access terminal) at the edge of the access point's coverage range.

An access point may perform this monitoring using a network listen module (NLM) or other suitable component(s). The NLM is a subsystem of the access point that has mobile-like capabilities that enable the access point to listen for (sometimes referred to as "sniffing") RF signals from neighboring access points (e.g., macro access points and/or femto access points). The access point may then measure a suitable channel quality metric (e.g., received signal strength) based on these signals. From this metric, the access point may set the initial transmit power to be used by the access point. This initial transmit power may comprise, for example, an initial value to be used for the transmit power or an initial range (e.g., specified by minimum and maximum limits) within which the transmit power is to be limited.

The NLPC channel monitoring may involve acquiring different types of signal information depending on the type of deployment, the type of channel(s) being monitoring, and potentially other factors. For example, the access point may monitor the carrier frequency that carries the access point's service channel or the access point may monitor other carrier frequencies that carry other types of channels (e.g., beacon channels)

In some deployments, a femto cell transmits beacons on one or more carrier frequencies used by other access points (e.g., macro carrier frequencies). In this case, the femto cell may use NLPC to control transmit power on each of these carrier frequencies to mitigate any interference the transmission of these beacons may have on nearby access terminals operating on those frequencies (e.g., so-called macro access terminals that are currently being served by a macro cell).

Beacon power may be calibrated by measuring the surrounding macro network's forward link (FL) channel quality using the NLM. For example, the femto cell may use the NLM to scan for pilots from the macro access point(s) on each frequency and measure the corresponding pilot energy (e.g., Ecp). Using these received signal measurements and a defined (e.g., assumed) coverage range, the femto cell may adapt its beacon transmit power based on the femto cell's location in the macro network. For example, the femto cell uses lower transmit power if the femto cell is deployed at the edge of a macro cell. Conversely, the femto cell uses higher transmit power if the femto cell is deployed at (e.g., near) the macro cell site.

In so-called co-channel deployments, a femto cell is deployed on the same carrier frequency as a macro cell. That is, the femto cell's forward link (also referred to as the downlink) is on the same carrier frequency as the macro cell's forward link. In this case, the femto cell may use NLPC to control transmit power on this carrier frequency to mitigate any interference the femto cell's transmissions may have on nearby access terminals (e.g., macro access terminals) operating on this frequency.

Here, the femto cell's forward link transmit power may be calibrated by measuring the surrounding macro cells' forward link channel quality (e.g., RSSI, Ecp/Io, RSCP). The femto cell uses the macro cell RSSI measurements and a defined coverage radius (as an input) to set the initial transmit power. The transmit power is chosen to satisfy an idle reselection requirement. For example, the femto cell CPICH Ec/Io should be better than Qqualmin for the femto cell at the edge of the coverage radius (or at a given path loss). To achieve this, the transmit power level is chosen as a function of the measured macro quality (CPICH/Io) and a path loss value. Furthermore, to limit interference induced at nearby access terminals (e.g., macro access terminals), another potential requirement is for the femto cell transmission to increase Io by at most a certain fixed amount at the edge of the femto cell coverage range (or at a given path loss). The femto cell transmit power is then chosen to be the minimum of these two criteria. Again, this allows the femto cell to adapt its transmit power based on its location in the macro network.

The transmit power is set lower at a location where macro cell RSSI is weak as compared to a location where macro cell RSSI is strong.

As represented by block 208 of FIG. 2, an access point also may employ active mobile protection in some implementations. For example, a femto cell's beacon transmissions may degrade the voice call quality of active macro users in the vicinity of the femto cell. To protect these active macro mobiles from such beacon interference, whenever the presence of a nearby active macro user is detected, the femto cell temporarily throttles (i.e., restricts) beacon transmissions.

Accordingly, an access point may regularly (e.g., continuously) monitor for the presence of nearby active non-home access terminals (e.g., active macro access terminals) and take action to restrict the access point's transmissions until that access terminal leaves the vicinity or ends the active communication. Once there are no longer any such active access terminals in the vicinity of the access point, the access point may resume using the transmit power level dictated by the other transmit power algorithms (e.g., NLPC or MART).

An access point may restrict its transmission in various ways. In some implementations, the access point temporarily reduces its transmit power. For example, the access point may temporarily reduce the maximum transmit power limit that it uses for transmitting beacons. In some implementations, the access point temporarily reduces the periodicity of its transmission. For example, in a case where the access point periodically transmits a beacon on a given carrier frequency (e.g., when time division multiplexing beacon transmissions on different carrier frequencies), the access point may temporarily reduce the period of time that a beacon is transmitted on the carrier frequency. In some implementations, the access point temporarily ceases transmission. For example, the access point may temporarily cease transmitting beacons on any macro carrier frequencies that are being used to send information to a detected access terminal.

An access point may employ various techniques for restricting transmission on a temporary basis. In some implementations, the access point restricts transmission for a defined period of time. For example, the access point may start a timer upon restricting transmission, and terminate the restriction of transmission once the timer expires. In some implementations the access point restricts transmission until a terminating event occurs. For example, in cases where detection of an access terminal is based on a measured received signal strength exceeding a threshold, the access point 104 may terminate the restriction of transmission when measured received signal strength falls below a certain configurable threshold. In any of these cases, upon terminating the restriction of transmission, the access point 104 may resume transmitting at the transmit power level and/or periodicity that was used prior to the restriction of transmission.

In some implementations, for robustness against channel fading, the transmit power is reduced to a value that is inversely proportional to the filtered RSSI. The proportionality constant is a tunable parameter used to trade-off between the amount of throttling applied to limit interference versus the reduction in femto cell coverage caused by the throttling.

An access point may detect the presence of an active access terminal in various ways. Several examples for the case where the access point comprises a femto cell that restricts its beacon transmissions follow.

In some implementations, the femto cell detects the presence of a nearby macro cell user by measuring received signal strength on the macro cell reverse link carrier frequency that is (or frequencies that are) paired with a macro cell forward link carrier frequency (or frequencies). This measurement may be referred to as a received signal strength indication (RSSI). For example, the measurement of a reverse link RSSI value that exceeds a certain expected value (e.g., a threshold) over a period of time may serve as an indication of the presence of an active macro cell user that is receiving on the corresponding forward link frequency. In the absence of any active macro user in the proximity of the femto cell, the reverse link RSSI is expected to be very close to a noise floor for the femto cell (e.g., a thermal noise level). Therefore, the rise of RSSI above a pre-computed threshold that is based on this noise floor may be used as an indication of the presence of an active macro user nearby. The throttling may then be discontinued after a time-out or when RSSI again falls below a defined threshold.

In some implementations, the presence of a nearby active macro cell user may be known apriori to the access point. For example, in a case of active handover of an access terminal from a femto cell to a macro cell (commonly referred to as active hand-out) for a restricted user or guest user, the femto cell will know that this access terminal is in the vicinity of the femto cell and is now being served by the macro cell. The femto cell may therefore restrict transmission (e.g., apply beacon throttling) on the downlink carrier frequency or the set of downlink carrier frequencies on which the macro cell user receives information from the macro network. Thus, in the case where the femto cell supports signaling-only access mode (e.g., hybrid mode), throttling may be applied when an alien access terminal camping on the femto cell is handed-out to the macro cell for active mode service.

As represented by block 210 of FIG. 2, an access point may regularly (e.g., periodically) monitor for changes in channel quality to determine whether to temporarily revert back to NLPC. For example, if there has been a recent significant change in channel quality (e.g., due to a change in the location of the access point, and/or installation/removal of access points in the vicinity), the information collected for MART may be considered unreliable. In such a case, the access point may switch back to the NLPC state to reestablish initial transmit power limits for the access point until new MART information is acquired.

Thus, in addition to initial power setting upon initialization, the NLPC technique may be used for recalibration purposes to identify changes in the RF environment due to events such as a change in an access point's location and adjust the transmit power accordingly. Such recalibration may be initiated autonomously by the access point or directed by the network. Recalibration may also be initiated upon re-power-up or reset of the femto cell. After reset or re-power-up, the femto cell may first check for changes in channel quality. If no significant change is detected, the femto cell may use the transmit power that was used prior to the reset or re-power-up event. Otherwise, the femto cell may switch back to the NLPC state to reestablish initial transmit power levels.

In practice, NLPC may have certain inherent limitations. First, the desired femto cell coverage range (e.g., beacon coverage radius), which may be a user input, may not be the correct estimate. For example, whether the femto cell is deployed in a small apartment or a large house may be a priori unknown. Second, user traffic in the apartment vicinity may vary significantly from apartment to apartment. For example, whether the femto cell is deployed in an apartment-unit facing a busy street or a street with very light traffic may not be known a priori. Third, NLPC assumes that the macro channel quality throughout the apartment or house is same as that measured by the NLM at the femto cell installed location. In practice, however, there may be a significant RF mismatch between RF conditions at the femto cell and at the access terminals in the apartment/house. Thus, NLM measurements may not truly represent the RF environment throughout the apartment/house. The RF mismatch at the femto cell and that experienced by users at different locations in the apartment/house affects performance. For example, when placed near a window, a femto cell detects a strong macro signal and transmits at a high power, which causes interference to outdoor users and at same time is more than adequate to provide coverage inside the house, where macro channel quality is weak.

Due to these limitations, NLPC may result in an unnecessarily high or low transmit power level. Therefore, it is desirable to fine tune the femto cell transmit power and its coverage for better adaptation to the deployment scenario. Such fine tuning can be achieved through the use of the MART operations described in FIG. 3.

In some implementations, MART is based on channel quality reports regarding channel quality on one or more frequencies obtained from home access terminals (hereafter referred to as HAT reports) and/or statistics of registrations performed by access terminals (e.g., preferred access terminals or non-home access terminals such as macro access terminals) that are in the femto cell's coverage. Here, after applying NLPC, MART is performed regularly (e.g., every 24 hours, every couple of days) by collecting HAT reports and access terminal registration statistics. In this way, MART may be used to determine optimal long term transmit power levels for the access point.

In some aspects, adequate coverage for home access terminals may be ensured through the use of HAT reports. Based on HAT feedback, a femto cell may learn the desired coverage range (i.e., path loss at different locations in the building) and RF conditions in the building and then choose an optimal transmit power level. For example, a femto cell may transmit beacons at a relatively higher power when deployed in a large building as compared to when deployed in a small building.

In some aspects, a large number of registrations by alien access terminals is an indication of beacon leakage outside the home. Therefore, when the number of registrations by alien access terminals is above a certain configurable threshold, beacon power and therefore the coverage range of the femto cell is reduced to control beacon interference to alien access terminals.

Figure 3:
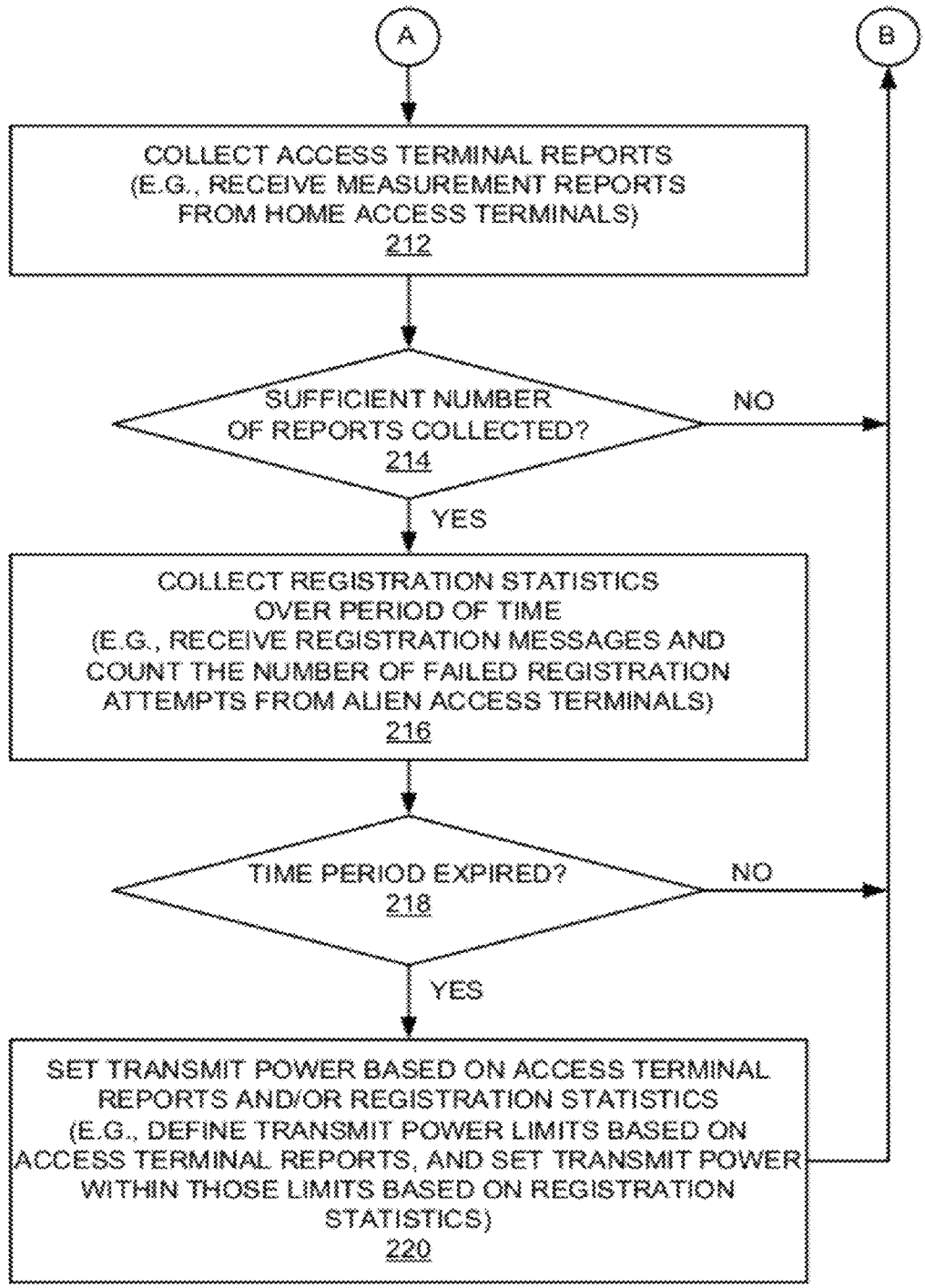

Blocks 212-220 of FIG. 3 represent several operations that may be performed in a sample MART implementation.

Blocks 212 and 214 represent the collection of HAT reports. These reports may be sent autonomously by the access terminals, or an access point may request an access terminal to periodically measure and report back channel quality. In some implementations, a change in transmit power based on HAT reports may not be made until the access point has received a sufficient number (e.g., a defined number) of HAT reports. Accordingly, the access point may continue transmitting at a power level designated by NLPC or some other algorithm until the desired number of HAT reports has been received. During this time, the access point may account for active access terminals and changes in RF conditions as discussed above at blocks 208 and 210.

Blocks 216 and 218 represent the collection of registration statistics. These registration statistics may correspond to, for example, the number of registrations attempts (e.g., failed registrations by alien access terminals) made at the access point over a defined period of time. Here, once the period of time expires, the access point may count the number of registration attempts that occurred during the period of time. Accordingly, the access point may continue transmitting at a power level designated by NLPC or some other algorithm until the period of time has expired. During this time, the access point may account for active access terminals and changes in RF conditions as discussed above at blocks 208 and 210.

As represented by block 220, the access point sets its transmit power based on the HAT reports and/or the registration statistics. By combining information from the HAT reports and registration statistics from macro (and/or other femto) access terminals, the femto cell may choose a desired transmit power setting to balance the coverage versus interference minimization trade-off. For example, using the received reports, a femto cell may estimate the path loss to a home access terminal at different locations in a building as well as the macro channel quality (and/or received signal power) at these locations. The femto cell may thus learn the required coverage range and RF conditions in the building and fine tune its transmit power accordingly. As a result, the femto cell may automatically transmit at a relatively higher power when deployed in a large building as compared to when it is deployed in a small building.

In some implementations, femto cell transmit power is chosen to satisfy a home access terminal coverage constraint and a macro cell user protection constraint. For the access terminal coverage constraint, the transmit power level is chosen such that the CPICH Ec/Io experienced by a home access terminal at the edge of the femto cell coverage radius (e.g., at a given path loss from the femto cell) is above a certain threshold. For the macro cell user protection constraint, the transmit power level is chosen to limit the impact of the femto cell transmissions on alien macro access terminals at a given path loss from the femto cell. To achieve this, the transmit power level is chosen such that femto cell interference does not exceed the total received power (Io) on the macro cell frequency by more than a certain amount at the edge of the femto cell coverage radius (e.g., at a given path loss from the femto cell).

As mentioned above, different implementations may or may not employ one or more of NLPC, HAT-based MART, or registration-based MART. Accordingly, the interaction of these algorithms may depend in some aspects on which algorithms are used by the access point.

In one example of an implementation that supports an NLPC, HAT-based MART, and registration-based MART scheme, NLPC is used to define the transmit power limits initially used by the access point. Until a sufficient number of HAT reports are acquired, the actual transmit power used by the access point is set to a value within these limits based on the registration statistics. Once a sufficient number of HAT reports are acquired, the access point defines new transmit power limits based on the HAT reports. The actual transmit power used by the access point is then set to a value within the new limits based on the registration statistics (e.g., the number of failed registration attempts, the number of registration attempts received).

In another example of an implementation that supports an NLPC, HAT-based MART, and registration-based MART scheme, NLPC is used to define the transmit power initially used by the access point. Once a sufficient number of HAT reports are acquired, the access point defines transmit power limits based on the HAT reports. The transmit power is then defined within these limits based on the registration statistics.

In one example of an implementation that supports an NLPC and HAT-based MART scheme, NLPC is used to define the transmit power initially used by the access point. Once a sufficient number of HAT reports are acquired, the access point defines a transmit power level based on the HAT reports.

In one example of an implementation that supports an NLPC and registration-based MART scheme, NLPC is used to define the transmit power limits initially used by the access point. Once the period of time for collecting registration statistics expires, the access point defines a transmit power level within those transmit power limits based on the registration statistics (e.g., by incrementing or decrementing the transmit power within the limits set by NLPC). In some cases, this combination is used prior to the collection of a sufficient number of HAT reports. In these cases, the transmit power control may revert back to an NLPC, HAT-based MART, and registration-based MART scheme once sufficient HAT reports have been collected.

Figure 4:
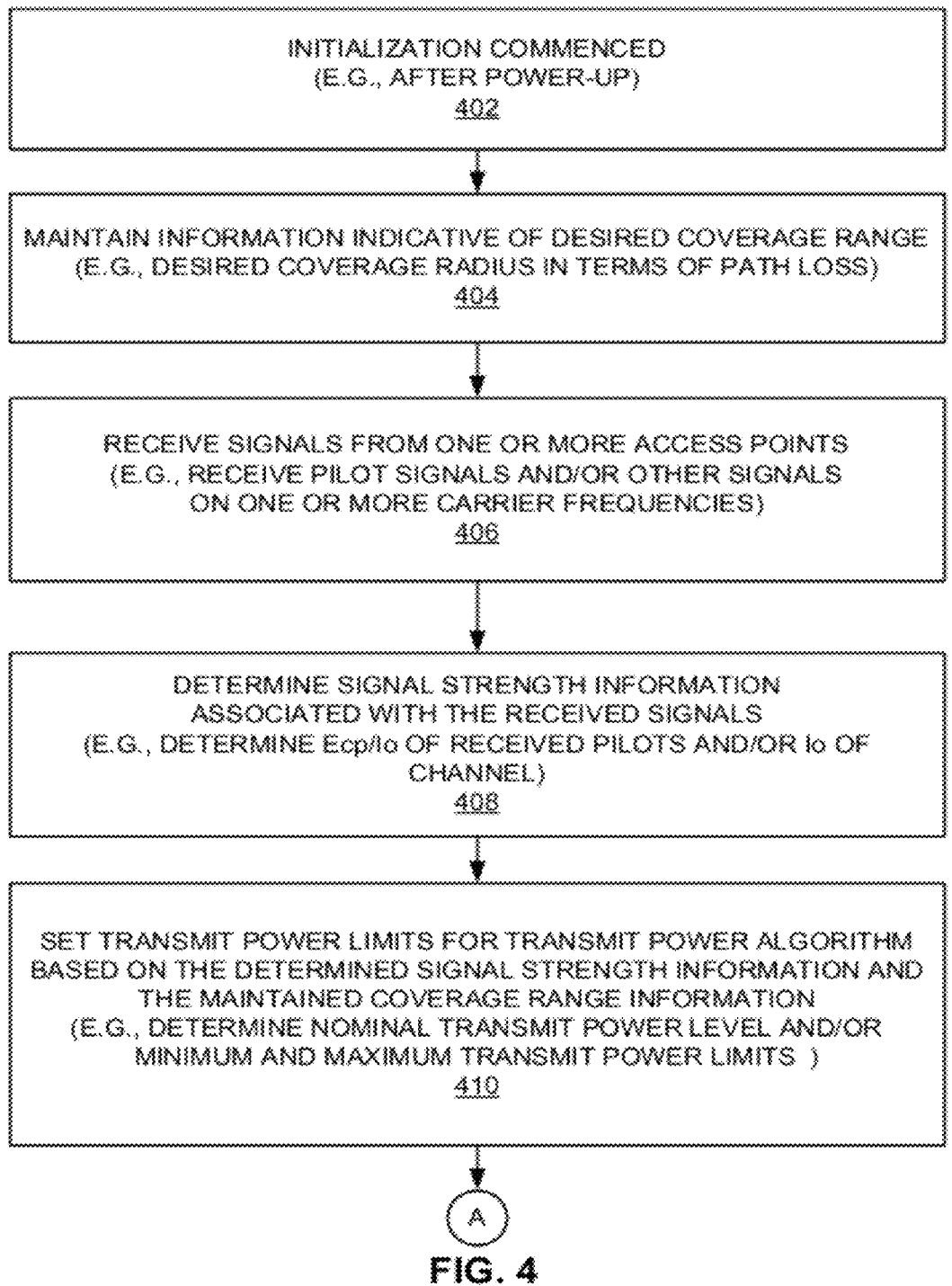
FIGS. 4 and 5 are a flowchart of several sample aspects of operations that may be performed in conjunction with a network listen-based algorithm that controls transmit power of an access point.
Figure 5:
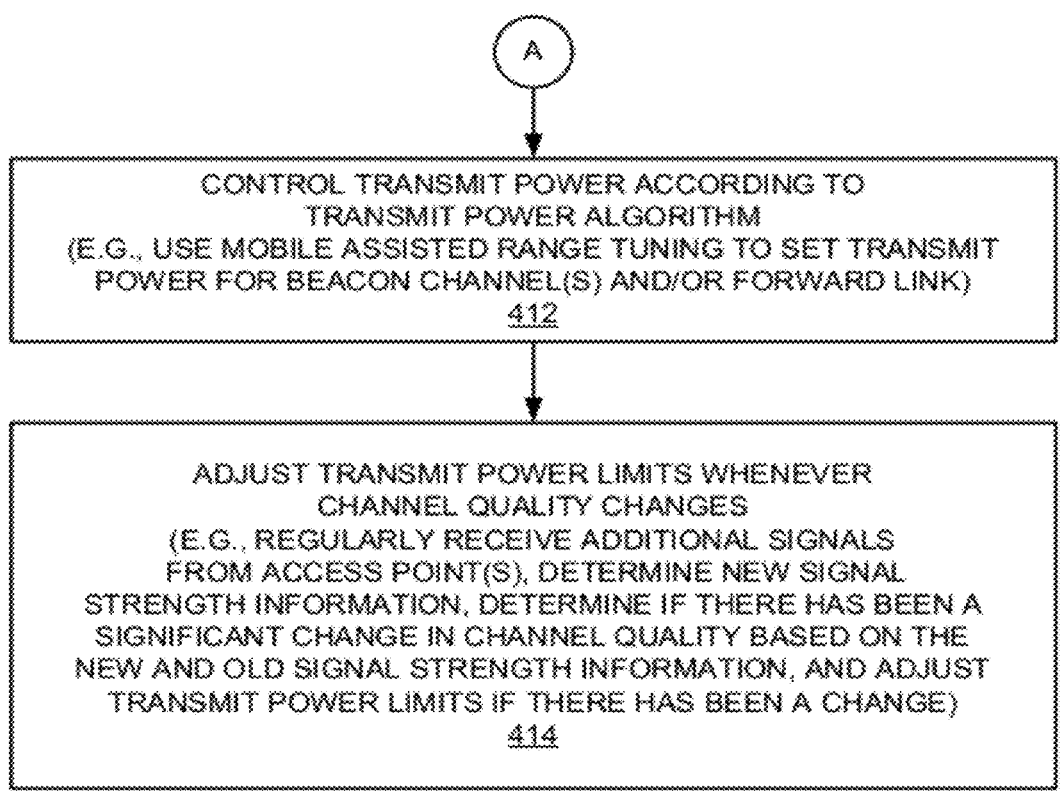

Referring now to the flowchart of FIGS. 4 and 5, additional details relating to how NLPC may be used at an access point to set transmit power limits for another transmit power control algorithm is described. It should be appreciated that the operations described below also may be applicable to using NLPC to set a specific transmit power value.

As represented by block 402 of FIG. 4, the described operations begin with initialization of the access point. Here, the access point may provide a mechanism to determine that initialization has commenced (or, as discussed below, that recalibration is needed) and trigger the commencement of NLPC based on this determination.

As represented by block 404, the access point maintains information indicative of a desired coverage range for the access point during NLPC. For example, this information may comprise a first path loss value corresponding to a larger coverage radius for high power beacons and second path loss value corresponding to a smaller coverage radius for low power beacons. These parameters may be provisioned by the network (e.g., over the backhaul) or the access point may use certain typical values. In either case, these values may be stored in a memory component of the access point.

As represented by block 406, the access point is configured to monitor for signals from other access points on one or more carrier frequencies (e.g., by using a network listen module). For example, in a co-channel deployment, the access point may monitor the carrier frequency used for the access point's service channel for signals (e.g. pilots) from other access points. In a deployment where the access point transmits beacons on a carrier frequency (e.g., a macro carrier frequency) other than the access point's service channel carrier frequency, the access point may monitor that carrier frequency for signals from other access points. It should be appreciated that the access point may monitor more than on carrier frequency (e.g., in cases where the access point needs to control transmit power on more than one carrier frequency).

As represented by block 408, the access point determines signal strength information associated with the received signals. In this way, the access point may estimate the channel quality at the access point due to transmissions by neighboring access points. For example, in some implementations, the access point may measure the received pilot energy (e.g., Ecp) for each macro access point operating on a given carrier frequency. In some implementations, the access point may measure total signal power Io (e.g., total RSSI) along with CPICH RSCP and/or CPICH Ec/Io and/or path loss for access points on a given carrier frequency.

As represented by block 410, the access point sets transmit power limits for another transmit power algorithm based on the determined signal strength and the maintained coverage range information. For example, the access point may initially determine a nominal transmit power level based on the signal strength and coverage range information. The access point may then define upper and lower limits based on the nominal transmit power level (e.g., by adding a Δ to provide the upper limit and subtracting a Δ to provide the lower limit). Two sample implementations for determining such a nominal transmit power value follow.

The first implementation may be employed, for example, in a deployment where a femto cell transmits beacons on a macro carrier frequency that is different from the service channel carrier frequency of the femto cell. Here, the femto cell scans for macro access point pilots and determines the pilot energy ($Ecp_{macro}$) of the strongest macro access point. In addition, a high power beacon coverage radius $PL_{high}$ and a low power beacon coverage radius $PL_{low}$ are defined in term of path loss for beacon transmissions as discussed above.

Different algorithms are employed for setting the transmit power depending on whether the monitoring results in detection of a macro access point. If no macro access point is detected, the nominal transmit power ($P_{low}$) for the low power beacon is set to the minimum beacon power level specified for the femto cell. In addition, the nominal transmit power ($P_{high}$) for the high power beacon is set a defined amount (e.g., +Δ) higher than the low power beacon transmit power (constrained by an upper limit of the maximum beacon power level specified for the femto cell).

If a macro access point was detected, $P_{low}$ is set to $Ecp_{macro}+PL_{low}+Hyst+EcpIor_{beacon}$ (constrained by the maximum and minimum beacon transmit power levels). Note that the equations assume all quantities are in log scale, i.e., dB, dBm units. Similarly, $P_{high}$ is set to $Ecp_{macro}+PL_{high}+Hyst+EcpIor_{beacon}$ (constrained by the maximum and minimum beacon transmit power levels, and also constrained to be at least a defined amount (e.g., +Δ) higher than $P_{low}$). Here, Hyst is a configurable parameter that controls beacon power relative to macro pilot energy and $EcpIor_{beacon}$ is a configurable parameter representing the ratio of pilot power to the total power transmitted on the beacon channel. Hyst is typically chosen based on handoff hysteresis criteria used by access terminals for determining when to handoff from a macro pilot to a beacon pilot. In some aspects, the above equations may ensure that an access terminal at the path loss edge receives sufficient power from the access point to cause the access terminal to hand-in to the access point.

The nominal transmit powers determined above ($P_{high}$ and $P_{low}$) may then be used to define corresponding transmit power limits. For example, minimum and maximum transmit power limits for the low power beacon may be specified as $P_{low}-\Delta_1$ and $P_{low}+\Delta_2$, respectively. Similarly, minimum and maximum transmit power limits for the high power beacon may be specified as $P_{high}-\Delta_3$ and $P_{high}+\Delta_4$, respectively.

The second implementation mentioned above may be employed, for example, in a co-channel deployment. Here, a femto cell may estimate Io (e.g., by measuring the total RSSI) on the forward link carrier frequency. In addition, the femto cell determines an Io value ($Io_{withoutfemtos}$) corresponding to the interference contribution due to macro cells on this carrier frequency (e.g., the interference that would exist in the absence of any femto cells). The femto cell also maintains an Io value ($Io_{this femto}$) that corresponds to the allowed additional interference contribution due to transmissions by the femto cell (e.g., assuming certain loading). In addition, the femto cell maintains an EcpIo value ($EcpIo_{min,femtouser}$) that corresponds to the minimum desired downlink pilot strength (CPICH Ec/Io) experienced by a home access terminal of the femto cell (e.g., assuming certain loading at the edge of the femto cell coverage).

A nominal transmit power value is computed such that sufficient power is provided for a home access terminal at the coverage edge, while restricting this power by the amount of allowed interference. Specifically, the transmit power level is chosen such that the femto cell CPICH Ec/Io (for a given femto cell loading) at the coverage radius ($PL_{edge}$) exceed $EcpIo_{min,femtouser}$, while ensuring that the configured transmit power levels are within certain defined limits.

For example, a value ($P_{temp1}$) constrained by the allowed interference is set to $PL_{edge}+Io_{withoutfemtos}+Io_{this,femto}-EcpIor_{femto}$, where $EcpIor_{femto}$ is the ratio of pilot energy per chip to the total transmit power spectral density (e.g., CPICH Ec/Ior). In addition, a value ($P_{temp2}$) constrained by the power needed by a femto cell user is set to $PL_{edge}+Io_{withoutfemtos}$ (a parameter based on $EcpIo_{min,femtouser}$, $EcpIor_{femto}$, and a loading factor).

The nominal transmit power ($P_{femto}$) is then selected as the minimum of these two values ($P_{temp1}$ and $P_{temp2}$) constrained by the minimum and maximum permissible values of the total femto cell transmit power. This nominal transmit power may then specify the maximum transmit power. This value may then be used to define corresponding transmit power limits. For example, minimum and maximum power limits for the femto cell transmission on the forward link may be specified as $P_{femto}-\Delta$ and $P_{femto}$, respectively.

Referring now to block 412 of FIG. 5, after the transmit power limits are defined at block 410, the access point (e.g., femto cell) employs another power control algorithm (e.g., HAT report-based and/or registration-based MART) to control the transmit power. For example, as discussed herein, a MART-based algorithm may specify a transmit power value within the transmit power limits defined at block 410. As discussed above, until a sufficient number of HAT reports are obtained, the access point may transmit using NLPC-based limits, where the actual transmit power value used within these limits is based on registration statistics. Then, once a sufficient number of HAT reports are available, new limits based on the HAT reports are provided. The actual transmit power value used within these new limits is again based on registration statistics.

As represented by block 414 of FIG. 5, the access point may regularly (e.g., periodically) perform network listen measurements to determine if NLPC recalibration is needed. Such a recalibration may be indicated, for example, as a result of a change in the location of the access point, as a result of a movement of objects in the access point's coverage area, or as a result of a new access point being deployed in the vicinity of the access point. The access point may adjust the transmit power limits (e.g., by setting new values as described above) whenever a change in the channel quality on a given carrier frequency (e.g., forward link or beacon channel) is detected. For example, upon receiving additional signals on the carrier frequency, the access point may determine new signal strength information associated with these additional signals and compare the new signal strength information with the prior signal strength information. If the result (e.g., difference or ratio) of the comparison exceeds a defined threshold, the access terminal may invoke NLPC recalibration to adjust the transmit power limits.

Figure 6:
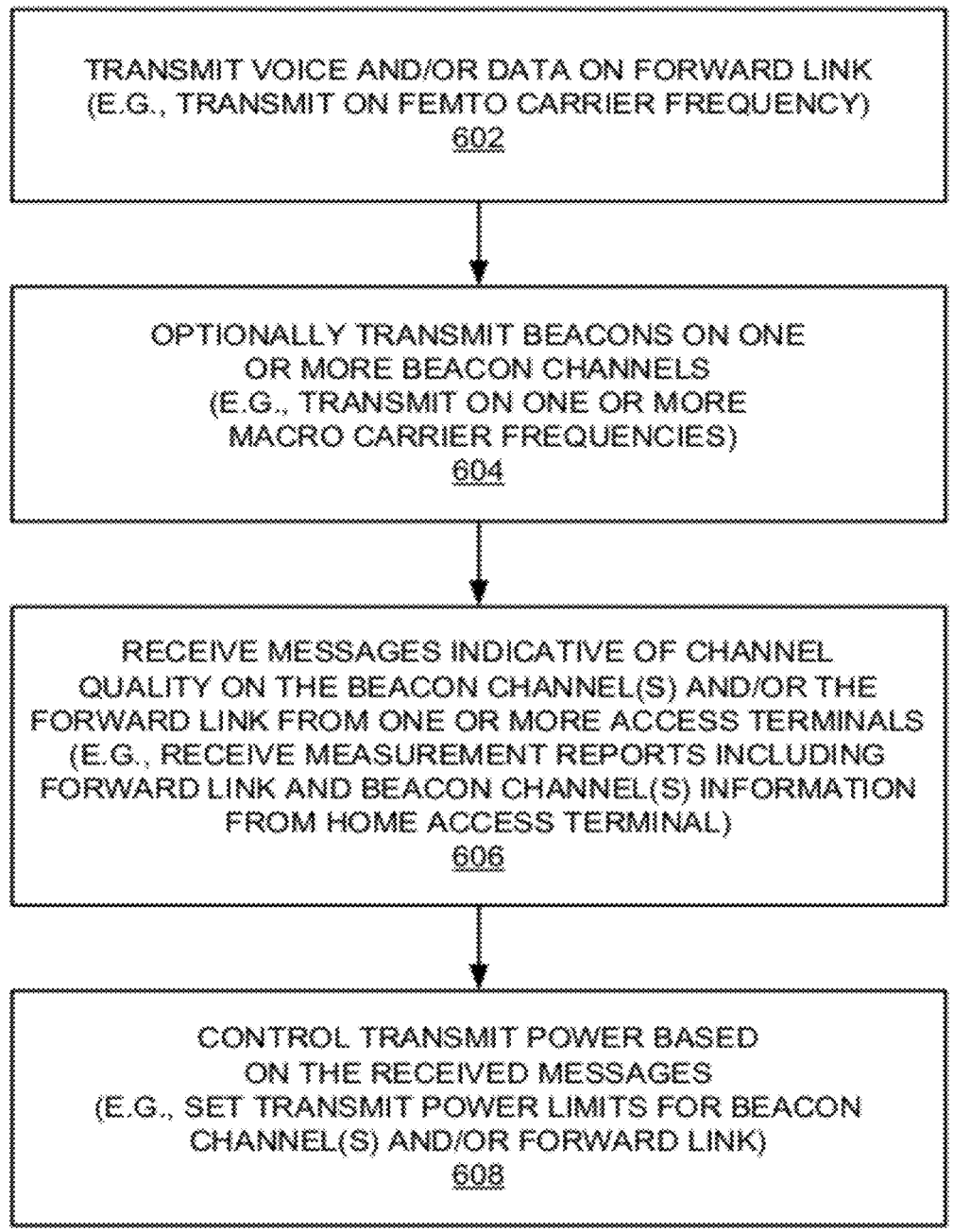
FIG. 6 is a flowchart of several sample aspects of operations that may be performed in conjunction with an access terminal message-based algorithm that controls transmit power of an access point.
Figure 7:
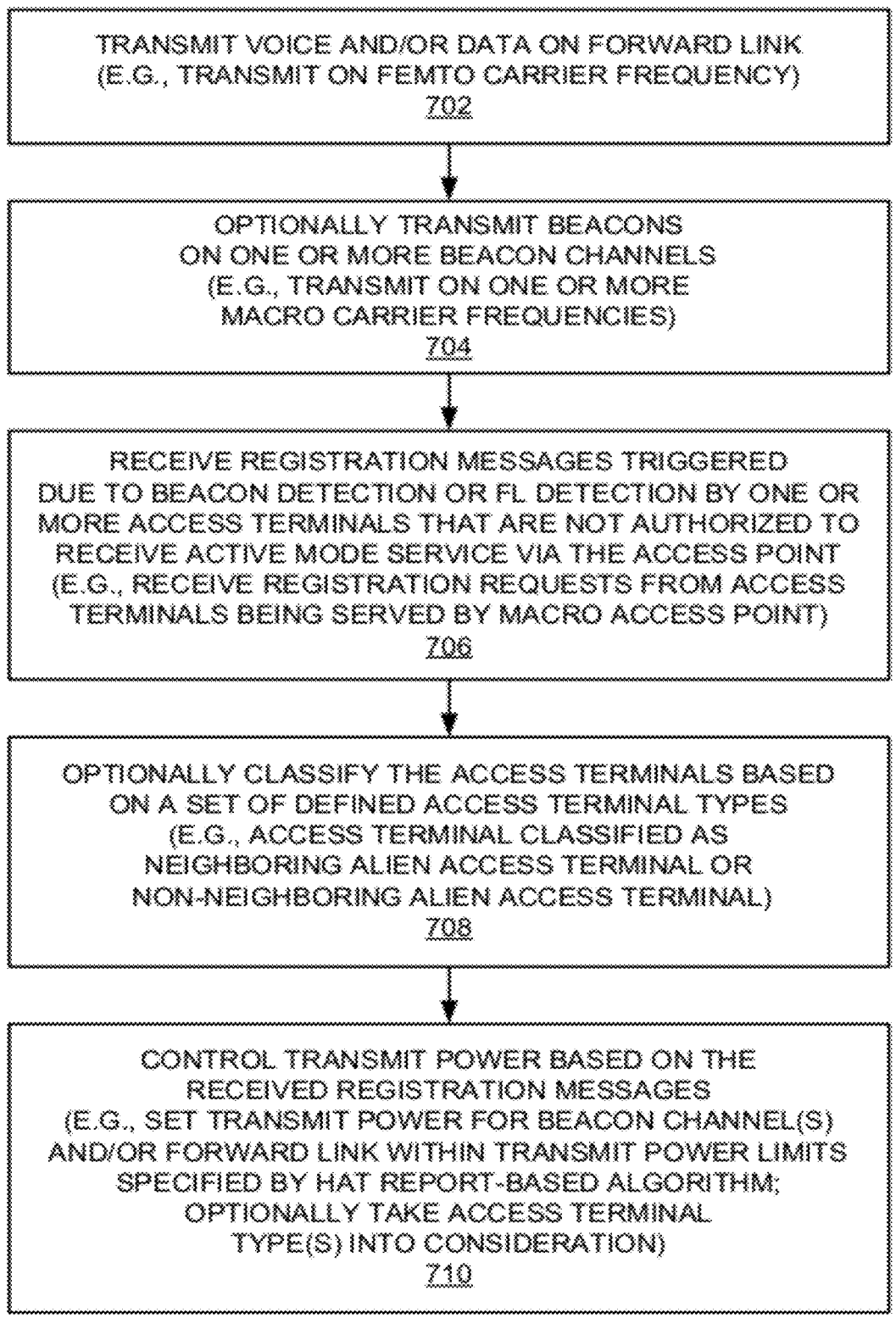
FIG. 7 is a flowchart of several sample aspects of operations that may be performed in conjunction with a registration message-based algorithm that controls transmit power of an access point.

Referring now to FIGS. 6 and 7, additional details of sample MART-related operations that may be performed by an access point (e.g., a femto cell) will now be described. Specifically, FIG. 6 describes sample operations for a HAT report-based scheme, while FIG. 7 describes sample operations for a registration-based scheme. In a typical scenario, each of these schemes involves collecting a corresponding set of statistics (e.g., statistics regarding path loss, channel quality from HAT reports or registration messages collected over a time period) and periodically updating transmit power based on the collected statistics.

In some aspects, the assumptions that follow may be applicable to the MART operations of FIGS. 6 and 7. First, the access point (e.g., femto cell) employs a restricted access policy or a signaling-only access policy. In the latter case, alien access terminals may register with the access point in idle mode and camp (stay connected in idle mode) on the access point, but cannot get active mode service. Second, the access point is able to distinguish between home access terminals and alien access terminals in some manner. For example, the access point may be able to distinguish access terminals based on their unique identifiers such as International Mobile Subscriber Identity (IMSI) or Electronic Serial Number (ESN). This information may be provisioned by the network to the access point or may be learned by the access point. For example, when an alien access terminal camping on a femto cell originates or receives a call, the access terminal will be re-directed to a macro access point for active mode service. The femto cell may therefore record the IMSIs of such access terminals to classify them as alien access terminals. Conversely, the IMSIs of mobiles that receive active service from the femto cell may be recorded and classified as home access terminals.

Referring initially to FIG. 6, as represented by blocks 602 and 604, an access point will transmit voice and/or data on a forward link and may transmit beacons on one or more beacon channels as described herein. For example, in a co-channel deployment, a femto cell may transmit pilots and service channel information on a carrier frequency that is shared with one or more macro cells. Also, in a non-co-channel deployment, a femto cell may transmit service channel information on a femto carrier frequency and transmit beacons on one or more macro carrier frequencies.

As represented by block 606, the access point receives messages indicative of channel quality on the forward link and/or a beacon channel. For example, the access point may receive measurement reports from a home access terminal as the access terminal moves throughout the coverage area of the access point. These measurement reports may include measurements the access terminal made on the forward link carrier frequency and/or on a macro carrier frequency or frequencies.

These reports may be triggered in various ways. In some cases, an access terminal may autonomously send a measurement report based on the occurrence of an event at the access terminal (e.g., a measurement reporting event). In some cases, the access point may request the access terminal to send measurement reports. For example, a femto cell may request an active home access terminal to send forward link channel quality reports corresponding to the femto cell and neighboring macro cells as well as other femto cells. Here, the request may specify that the reports are to be sent repeatedly (e.g., periodically such as every few seconds or minutes).

Measurement report messages may take various forms. For example, reports on the forward link service channel may be requested using periodic pilot strength measurement messaging (periodic PSMM) mechanisms in cdma2000 1xRTT femtocells. Similarly, reports on a frequency different from the service frequency may be requested using candidate frequency search (CFS) request and report mechanisms in cdma2000 1xRTT femtocells.

In UMTS, a femto cell may configure an event e1X through the use of measurement control messages. Such a message may be configured, for example, with the identifiers (e.g., primary scrambling codes) of the macro cells and femto cells (including the requester) to be reported. The message also may specify the parameters to be reported (e.g., CPICH Ec/Io and CPICH RSCP).

The collection of HAT reports on the service channel and the beacon/macro channel may be synchronized. For example, beacon channel measurements may be requested within few hundred milliseconds or a few seconds of the forward link service channel measurements in order to correlate the information across frequencies and improve performance. For example, if the path loss to an access terminal at a given location is being determined based on a report of a femto cell's service channel and the channel conditions are being determined based on a report of a macro channel that the access terminal sent from that location, it is desirable that these reports be correlated in time so that the correct path loss is matched up with the reported channel conditions.

The information from the measurement reports may be processed in some cases. For example, the access point may store statistics (e.g., average Ecp/Io, average Io) based on the measurements. Also, filtering may be employed to ensure that multiple reports from a stationary access terminal do not bias the overall statistics. Also, filtering may be applied to ensure that information reported by an access terminal while or prior to being handed-over to another access point is not included in the statistics.

Depending on the technology and access terminal capabilities, additional information (e.g., path loss values) may be reported by an access terminal and stored in a database of the access point in conjunction with learning the RF environment in the building and adjusting transmit power accordingly. Also, the home access terminal reports may be collected in idle mode, if supported by the access terminal.

As represented by block 608 of FIG. 6, the access point controls its transmit power based on the messages received at block 606. For example, a femto cell may set a transmit power value or set transmit power limits (e.g., minimum and maximum limits) for its forward link and/or for a beacon channel. Two sample implementations for setting transmit power limits in this manner follow.

The first implementation may be employed, for example, in a deployment where a femto cell transmits beacons on a macro carrier frequency that is different from the service channel carrier frequency of the femto cell. For the femto forward link service channel, the femto cell collects the following information from the measurement reports: Pilot strength (Ecp/Io) of the femto cell forward link, Total received power (Io) measured by the access terminal. For the macro/beacon channel, the femto cell collects the following information from the measurement reports: Ecp/Io of the beacon forward link, Ecp/Io of macro access points, and total received power on the macro channel.

The femto cell also determines the path losses between the femto cell and different locations from which the home access terminal sent the measurement reports and computes statistics (e.g., median path loss, maximum path loss, or the cumulative distribution function (CDF)) on these path losses. For example, from the femto cell's forward link service channel Ecp/Io and the Io reported in the PSMM, $Ecp_{rx}$ (i.e., pilot energy received from the femto cell) can be computed. Using this information, the path loss is estimated as $PL=Ecp_{tx}-Ecp_{rx}$, where $Ecp_{tx}$ is the transmitted pilot energy which is known to the femto cell. Note that instead of using the forward link service channel information, the path loss may instead be estimated using beacon/macro channel information if the beacon pilot strength is reported in the CFS report.

A path loss value is computed for each home access terminal report. Thus, the femto cell learns the path loss to the access terminal at the time when the home access terminal report was sent. Corresponding to each of these path loss values, the femto cell also learns the macro channel quality from the home access terminal reports. For example, the path loss can be learned from a PSMM and the macro quality can be learned from a CFS report received within a short duration of receiving the PSMM.

The low power and high power beacon coverage radius ($PL_{low}$ and $PL_{high}$) in terms of path loss is estimated from the path loss statistics. For example, $PL_{low}$ is chosen as the median value and $PL_{high}$ is chosen as the maximum value. Alternatively, $PL_{low}$ and $PL_{high}$ can be chosen as certain defined percentages value on the path loss CDF such that satisfactory coverage can be achieved. These defined percentages are configurable parameters that may be provisioned, for example, by the network. In some other case, $PL_{low}$ can be chosen relative (e.g. 5 dB below) to $PL_{high}$, which can be chosen as the maximum path loss value. Note that these $PL_{low}$ and $PL_{high}$ path loss parameters may be different from the path loss parameters described above for NLPC.

Nominal transmit power levels are then computed for the low and high power beacons by determining the transmit power needed to provide a desired level of coverage at all or a subset of the locations from which reports were received (i.e., corresponding to the computed path losses). For example, for the lower power beacon, all home access terminal reports that have path loss smaller than $PL_{low}$ [dB] are denoted as $S_{low,cov}$. Also, the $Ecp_{macro}$ (i.e., the pilot energy of the best macro cell for each report in this set) is determined based on the macro Ecp/Io and Io on the macro carrier frequency. The rest of the operations are performed on reports in this set. Let N be the number of reports in this set and let $PL(i)$ and $Ecp_{macro}(i)$ denote the path loss value and the best macro cell's pilot energy obtained from the ith report in this set. Now within the permissible power range $[P_{min}, P_{max}]$ that depends on femto cell capabilities, find a minimum power value (say, $P_{temp}$) such that the coverage criteria $P_{temp}=Ecp_{macro}(i)+PL(i)+Hyst-EcpIor_{beacon}$ is satisfied for all or a subset of the reports out of the N reports. Thus, this calculation is similar to the corresponding equation described above at block 410 for the non-co-channel scenario. Here, the degree of coverage achieved using low power beacon can be controlled by choosing all or a subset of the HAT reports. The nominal low power beacon transmit power level $P_{low,nominal}$ [dBm] is then set equal to $P_{temp}$ [dBm]. Operations similar to the above are also performed for the high power beacon to obtain $P_{high,nominal}$ [dBm].

If applicable, the low and high transmit power limits are then set by subtracting and adding deltas to the nominal values. For example, for the low power beacon, the minimum and maximum transmit power limits are $P_{low,nominal}-\Delta_1$ and $P_{low,nominal}-\Delta_2$, respectively. As one example, the deltas may be on the order of 5 dB or 10 dB.

The second implementation mentioned above may be employed, for example, in a co-channel deployment. Here, a femto cell estimates the desired coverage range for femto cell downlink transmissions and computes transmit power limits based on HAT reports.

For the coverage range estimation, the femto cell computes statistics (e.g., median, max or the cumulative distribution function (CDF)) of the path losses learned from the HAT reports. As above, the path losses are from the femto cell to the home access terminal for each reporting location. The femto cell then computes the path loss value $PL_{edge}$ from the path loss statistics. For example, $PL_{edge}$ can be set to the maximum path loss value or relative to maximum path loss value (e.g., certain dB below maximum path loss value) or corresponding to a certain defined percentage value of the path loss CDF that can provide satisfactory coverage or a defined quantity of the path loss values (corresponding to the reporting locations) that are to be covered by the femto cell transmissions.

A nominal transmit power level is then computed by determining the transmit power needed to provide a desired level of coverage at all or a certain defined subset of locations from which reports were received (i.e., as indicated by path losses less than $PL_{edge}$). For each HAT report, a nominal transmit power with a macro constraint ($P_{nominal,temp1(i)}$) is set to $PL_{(i)}+Io_{withoutfemtos(i)}+Io_{this,femto}-EcpIor_{femto}$, where $PL_{(i)}$ is the path loss for the $i^{th}$ report. In addition, for each HAT report, a nominal transmit power with a femto constraint ($P_{nominal,temp2(i)}$) is set to $PL_{(i)}+Io_{withoutfemtos(i)}+$(a parameter based on $EcpIo_{min,femtouser}$, $EcpIor_{femto}$, and a loading factor). Thus, these calculations are similar to the corresponding equations described above at block 410 for the co-channel scenario.

For each HAT report, another nominal transmit power ($P_{nominal,temp3(i)}$) is then selected as the minimum of these two values ($P_{nominal,temp1(i)}$ and $P_{nominal,temp2(i)}$). The nominal transmit power ($P_{nominal}$) is then computed using statistics of the set $P_{nominal,temp3(i)}$. For example, $P_{nominal}$ is set to the maximum of $P_{nominal,temp3(i)}$ over all reports or chosen as the minimum transmit power value out of all $P_{nominal,temp3(i)}$ values such that the femto cell can provide coverage to all or a subset of the locations from which the HAT reports were received. The value $P_{nominal}$ is constrained by the minimum and maximum permissible values of the total femto cell transmit power. This nominal value may then be used to define corresponding transmit power limits, if applicable. For example, minimum and maximum transmit power limits for the femto cell transmission on the forward link may be specified as $P_{nominal}-\Delta_1$ and $P_{nominal}+\Delta_2$, respectively.

Referring now to FIG. 7, operations relating to determining a transmit power value based on registrations will now be described. As represented by blocks 702 and 704, the access point will transmit voice and/or data on a forward link and may transmit beacons on one or more beacon channels as described herein (e.g., as described above at blocks 602 and 604). It should be noted that in implementations where MART employs both HAT reports and registrations, the operations of blocks 706-710 may simply follow the operations of block 608 of FIG. 6.

As represented by block 702, at various points in time, the access point may receive registration messages from one or more access terminals (e.g., alien access terminals). For example, upon receiving a beacon from a femto cell on a macro carrier frequency, a macro access terminal may attempt to register at the femto cell (e.g., by sending a message that requests registration). Similarly, upon receiving a pilot from a femto cell on a shared femto and macro carrier frequency, a macro access terminal may attempt to register at the femto cell. Thus, in these cases, a registration message is triggered due to beacon or pilot detection by the macro access terminal.

Upon receiving a registration message, the access point determines whether to accept or reject the request for registration. To the end, the access point may determine whether the access terminal is authorized to receive active mode service via the access point. For example, a femto cell may determine whether the access terminal is a home access terminal or an alien access terminal. This determination may be based, for example, on access control at the femto cell. If the access terminal is not allowed access (e.g., the registration attempt is rejected), the access point may increment a counter maintained for the current collection time period.

The access point may maintain such registration statistics corresponding to different transmit powers. For example, if a registration attempt was triggered by a beacon transmission, the access point may classify the registration attempt as resulting from a low power beacon or a high power beacon. Thus, registration counters for low and high power may be used to fine tune low and high power levels, respectively. For example, the high or low beacon transmit power may be adjusted based only on those registration attempts that were triggered by corresponding high or low power beacons. An access point may distinguish whether registration was triggered due to beacon detection or detection of the access point's forward link signal using a reverse mapping of the channel hashing function. Typically, access terminals "hash", i.e., idle on one of the several macro frequencies based on their IMSI and a channel hashing function as specified in the relevant communication standard. The access point can use the IMSI reported by the access terminal in the registration request and back compute using the channel hashing function where the access terminal was hashing prior to sending the registration request. If the hashing frequency is a beacon frequency, then the access point can determine that this registration was triggered due to beacon detection. Otherwise, the registration is determined to be triggered by forward link signal detection.

An access point may estimate that a given registration attempt was triggered by a low or high power beacon based on the transmit power level that was in use $T_{reg}$ seconds prior to receiving the registration attempt. Typically, an access terminal registration process is of the order of a second or so. Therefore, the $T_{reg}$ parameter is chosen accordingly.

As represented by block 708, in some implementations, the access point may classify the access terminals that sent the registration messages into a set of defined access terminal types. For example, the access point may determine whether an access terminal is a neighboring alien access terminal (relative to the access point) or a non-neighboring alien access terminal. The access point may then maintain separate counts for the different types of access terminals for the current collection time period.

Such a classification scheme allows an access point to provide different levels of protection from access point interference to neighboring access terminals as compared to non-neighboring access terminals. For example, since neighboring access terminals will be affected by access point interference for a longer duration, transmit power should be reduced even if very few neighboring access terminal registrations are observed.

The classification of access terminals may be performed in various ways. An alien access terminal may be classified as a neighbor by tracking how often (e.g., K days out of past L days) it registers and/or how long (e.g., a few hours) it stays in the coverage of the access point. An alien access terminal that regularly registers with the access point and/or stays in its coverage for a certain duration may be classified as a neighbor. An access point may determine how long an alien access terminal stays in the coverage of the access point by, for example, requesting such an access terminal to periodically register with the access point or acknowledge its presence by responding to a page message.

In view of the above, it may be expected that a neighboring alien access terminal (e.g., an access terminal belonging to a neighbor of a femto cell owner) would be camped on the access point for a longer amount of time than a non-neighboring alien access terminal (e.g., an access terminal belonging to a pedestrian or passenger in a car that is just passing by the femto cell). Consequently, the classification of the access terminal may be based on a period of time that an access terminal has camped on the access point.

In addition, it may be expected that a neighboring alien access terminal would attempt to register at the access point more frequently than a non-neighboring alien access terminal. Consequently, the classification of the access terminal may be based on a quantity of registration attempts that an access terminal has made at the access point over a given period of time.

The registration statistics may be generated in various ways. For example, rather than summing all registration attempts, different weights may be applied to neighboring vs. non-neighboring registrations and also for neighbors that register more frequently to determine the total registration count.

As represented by block 710, the access point controls its transmit power based on the registration messages received at block 706. For example, transmit power may be updated (e.g., increased or decreased by a defined amount) relative to the currently used power level based on the registration statistics from the last registration collection time period. In addition, as discussed herein, the selected transmit power level may be restricted by applicable transmit power limits (e.g., as specified at block 608 of FIG. 6 based on HAT reports).

In some implementations, the number of failed registration attempts is compared with a threshold. For example, if the number of registration attempts is greater than the threshold (e.g., thereby indicating beacon leakage outside of the building), the transit power is reduced. Conversely, if the number of registration attempts is less than or equal to the threshold (e.g., thereby indicating no beacon leakage outside of the building), the transmit power is increased.

In cases where statistics are maintained for different access terminal types (e.g., neighboring and non-neighboring alien access terminals), each set of statistics may be compared to a corresponding threshold. The decision on how to adjust the transmit power may then be made based on one or more of these comparisons.

In cases where statistics are maintained for different transmit power levels (e.g., high and low power beacons), each set of statistics may be compared to a corresponding threshold. The decision on how to adjust a given one of these transmit power levels may then be made based on the corresponding comparison.

In some implementations the amount of the transmit power adjustment is based on a comparison of the registration statistics to one or more parameters. For example, the number of rejected registrations may be compared (e.g., by determining a difference or ratio) with a threshold (e.g., the threshold discussed above). The magnitude of this comparison (e.g., the magnitude of the difference or the magnitude of the ratio) may then be used to specify the magnitude of the transmit power adjustment (e.g., a step-up value or a step-down value). In some implementations, this operation may be performed through the use of curves or tables that map the comparison values (differences or ratios) to step-up and step down values. Such a mapping may be constrained by minimum and maximum allowed step-up and step-down limits.

The transmit power control schemes described herein may be implemented in a variety of ways in different implementations. For example, the teachings herein may be employed to control transmit power on various types of channels (e.g., not just on beacon and service channels). Similarly, transmit power may be controlled based on information (e.g., Ec, i.e., energy per chip on a certain channel) obtained from various types of channels (e.g., not just from beacon and service channels).

An access point may transmit beacons on a single frequency or on multiple frequencies. If beacons are transmitted on multiple frequencies, the techniques described above may be applied on each frequency to determine the transmit power level on that frequency. Alternately, the same transmit power may be used on different frequencies or an average power level across different frequencies may be used or the transmit power level across different frequencies may be set in proportion to the macro signal strength measured on these frequencies by the access point (e.g., using the network listen module).

The above algorithms may be applied with some modifications to femto cells with different access policies. For femto cells with open access, the registration limits for alien access terminals may be higher than for femto cells with restricted or signaling-only access. The registration limits may be chosen based on field trials and considering deployment scenarios such as dense urban areas or suburban areas.

In addition to registration counts, a femto cell may use the number of neighboring mobiles to fine tune transmit power. For example, if the number of neighboring access terminals detected by the femto cell is above a certain threshold, the transmit power is reduced, otherwise it is increased.

The step-up and step-down sizes described herein may be selected in various ways. For example, step-up and step-down sizes may be chosen differently for low and high power beacons. In addition, the step-up and step-down sizes may be chosen as a function of the number of registrations counted and the registration limit. For example, if the number of registrations counted exceeds the registration limit by 100%, transmit power is reduced by $\Delta_{low,down}$, but if the number of registrations exceeds the registration limit by only 25%, the transmit power is reduced by $\Delta_{low,down}/4$.

Figure 8:
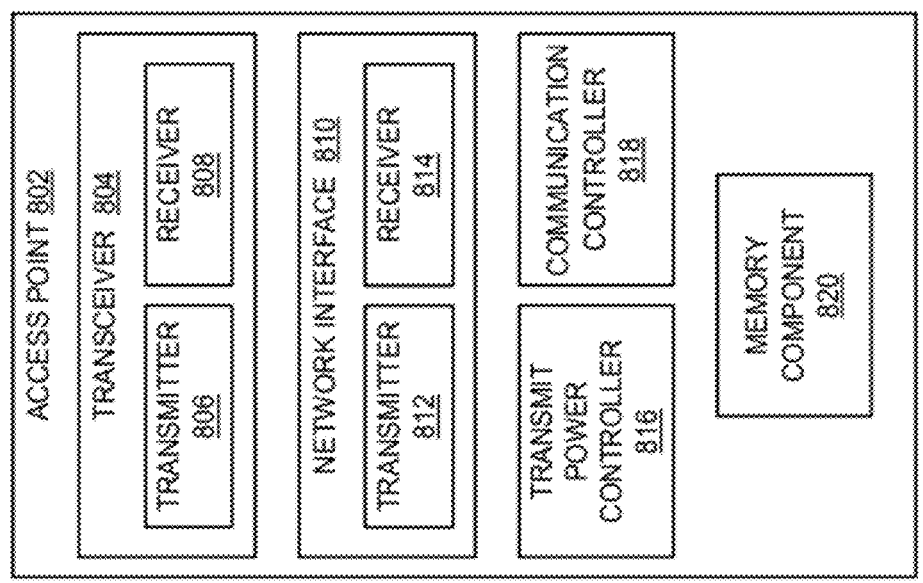
FIG. 8 is a simplified block diagram of several sample aspects of components that may be employed in communication nodes.

FIG. 8 illustrates several sample components (represented by corresponding blocks) that may be incorporated into nodes such as an access point 802 (e.g., corresponding to the access point 106 of FIG. 1) to perform transmit power control-related operations as taught herein. The described components also may be incorporated into other nodes in a communication system. For example, other nodes in a system may include components similar to those described for the access point 802 to provide similar functionality. Also, a given node may contain one or more of the described components. For example, an access point may contain multiple transceiver components that enable the access point to operate on multiple carriers and/or communicate via different technologies.

As shown in FIG. 8, the access point 802 includes a transceiver 804 for communicating with other nodes. The transceiver 804 includes a transmitter 806 for sending signals (e.g., data, beacons, messages) on one or more carrier frequencies and a receiver 808 for receiving signals (e.g., beacons, messages, registration messages, pilot signals, measurement reports, repeatedly monitoring for signals) on one or more carrier frequencies.

The access point 802 also includes a network interface 810 for communicating with other nodes (e.g., network entities). For example, the network interface 810 may be configured to communicate with one or more network entities via a wire-based or wireless backhaul. In some aspects, the network interface 810 may be implemented as a transceiver (e.g., including transmitter and receiver components) configured to support wire-based or wireless communication. Accordingly, in the example of FIG. 8, the network interface 810 is shown as including a transmitter 812 and a receiver 814.

The access point 802 includes other components that may be used in conjunction with transmit control-related operations as taught herein. For example, the access point 802 includes a transmit power controller 816 for controlling transmit power of the access point 802 (e.g., controlling transmit power based on received messages, identifying channel quality, setting at least one limit for transmit power, determining that an access terminal is actively receiving information, restricting transmission, setting transmit power to an initial value, defining transmit power limits, setting transmit power to a new value, temporarily restricting transmit power, determining a plurality of path losses, determining signal strength information, setting transmit power limits for a transmit power algorithm, determining that an initialization procedure has commenced, triggering the setting of transmit power limits, determining whether/that there has been a change in channel quality, adjusting transmit power limits, recalibrating transmit power) and for providing other related functionality as taught herein. In some implementations, some of the functionality of the transmit power controller 816 may be implemented in the receiver 808. The access point 802 also may include a communication controller 818 for controlling communications by the access point 802 (e.g., sending and receiving messages) and for providing other related functionality as taught herein. Also, the access point 802 includes a memory component 820 (e.g., including a memory device) for maintaining information (e.g., information indicative of a desired coverage range, HAT report information, registration statistics, and so on).

For convenience, the access point 802 is shown in FIG. 8 as including components that may be used in the various examples described herein. In practice, the functionality of one or more of these blocks may be different in different embodiments. For example, the functionality of block 816 may be different in a deployment where femto cells and macro cells share a carrier frequency as compared to a deployment where femto cells and macro cells use different carrier frequencies.

The components of FIG. 8 may be implemented in various ways. In some implementations the components of FIG. 8 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by blocks 804 and 810, and some or all of the functionality represented by blocks 816-820 may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
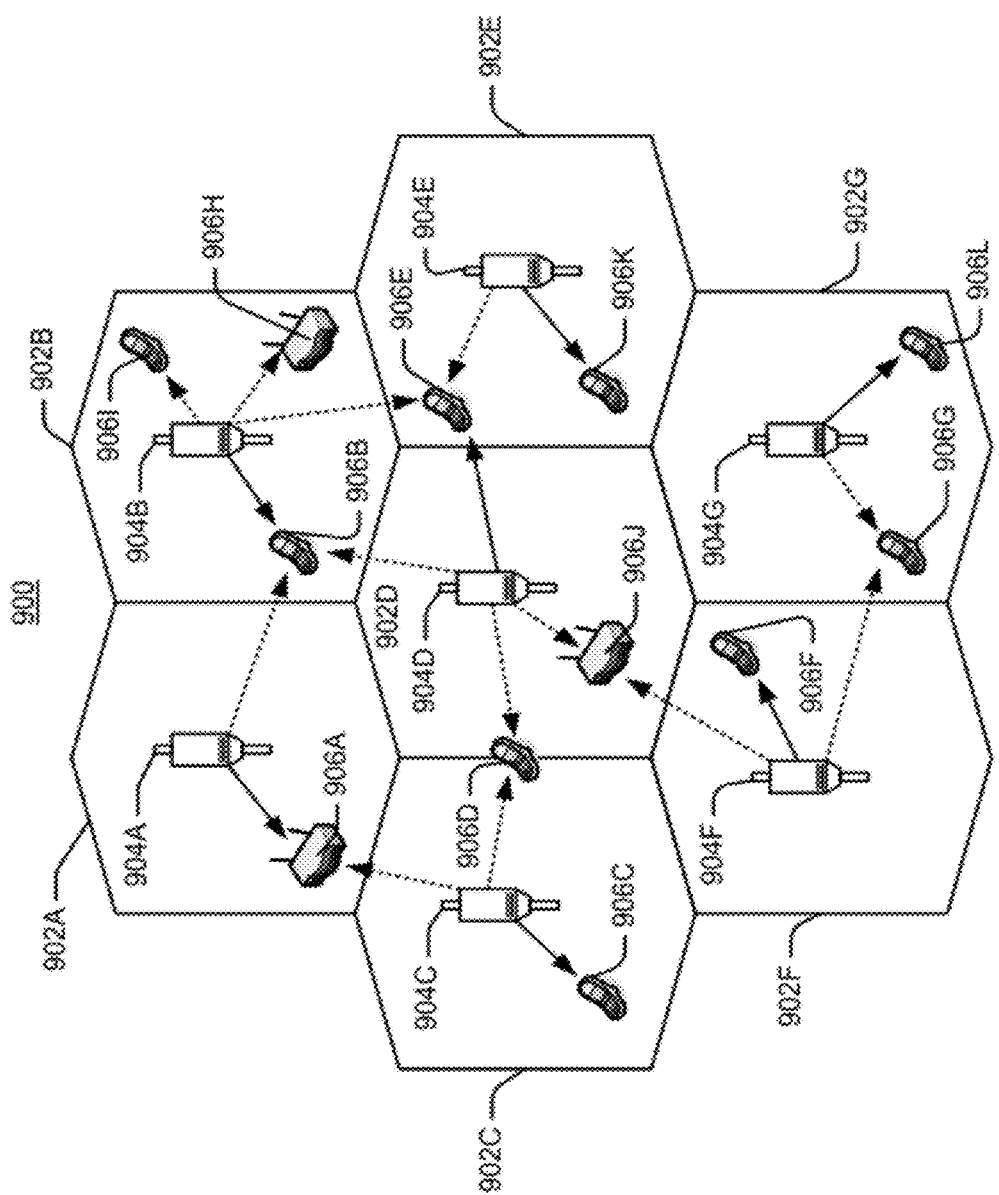
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
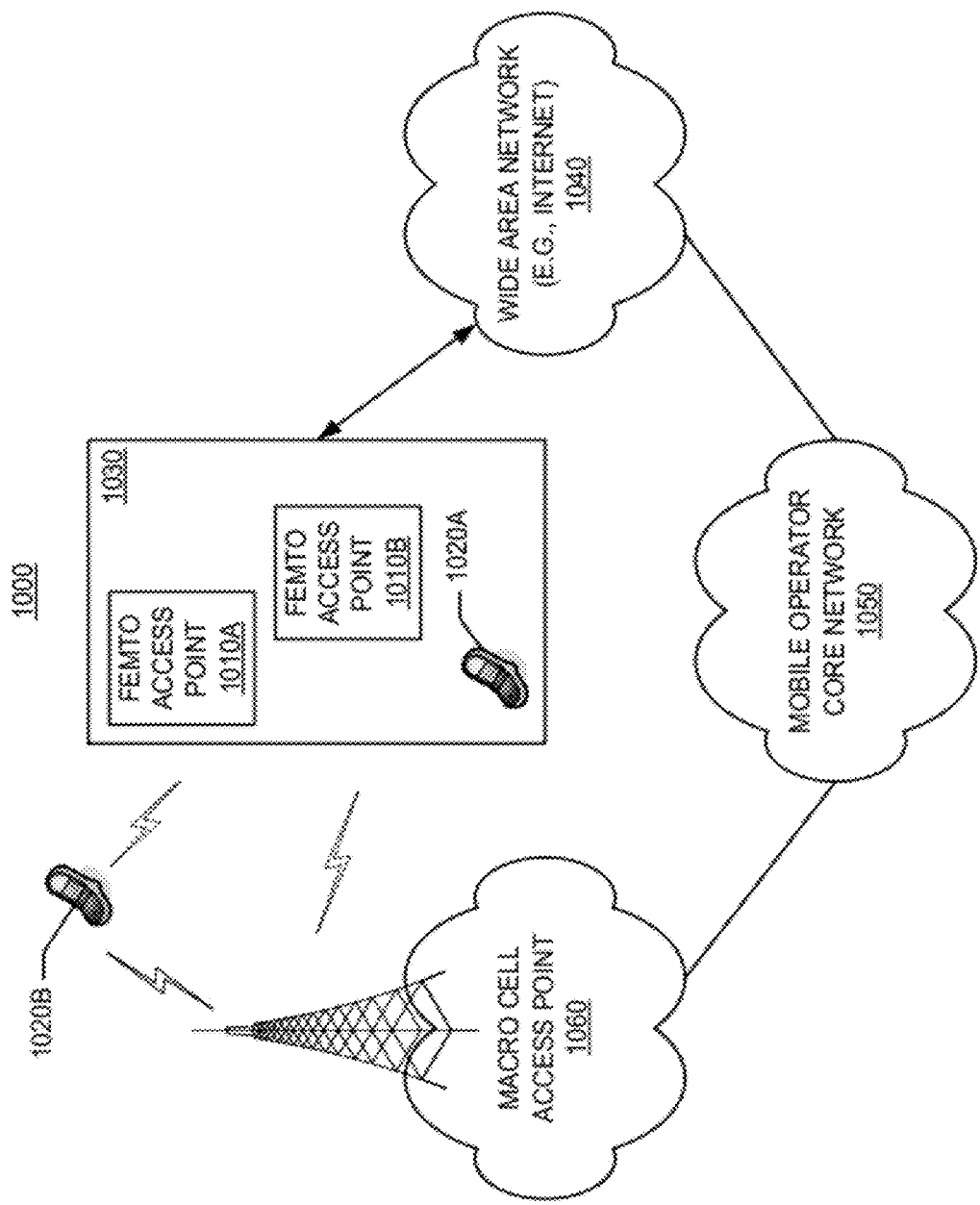
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
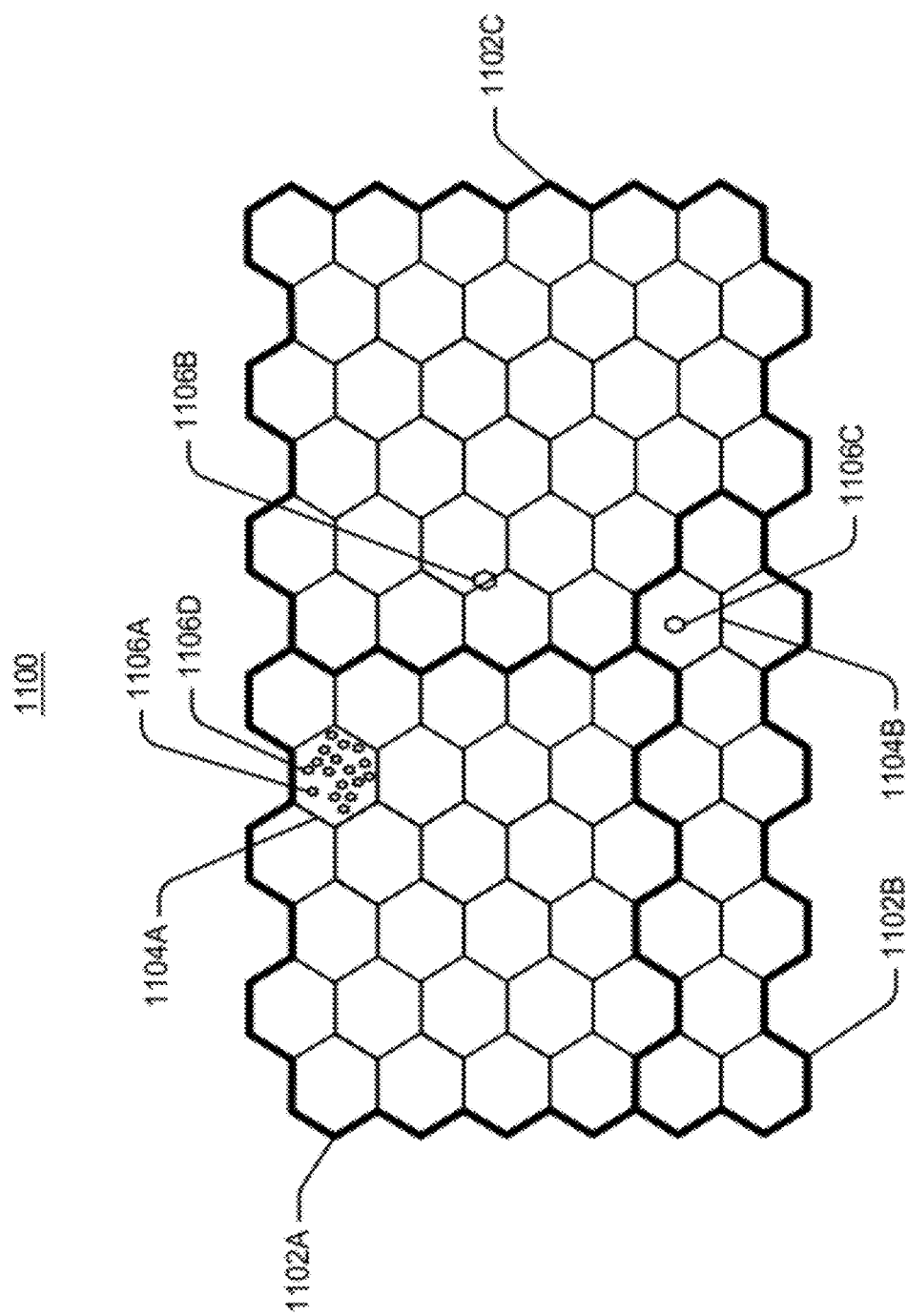
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
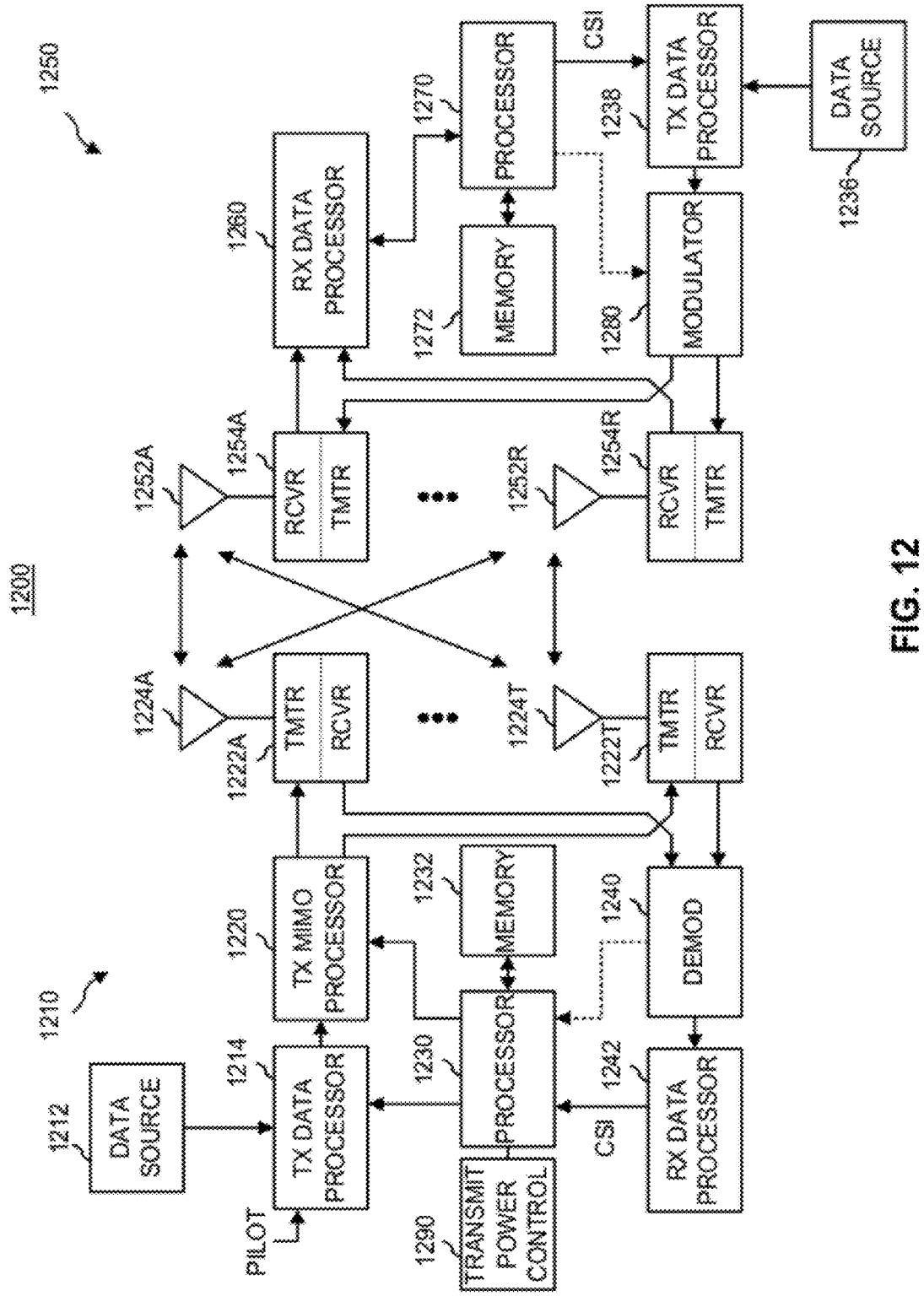
FIG. 12 is a simplified block diagram of several sample aspects of communication components.
Figure 13:
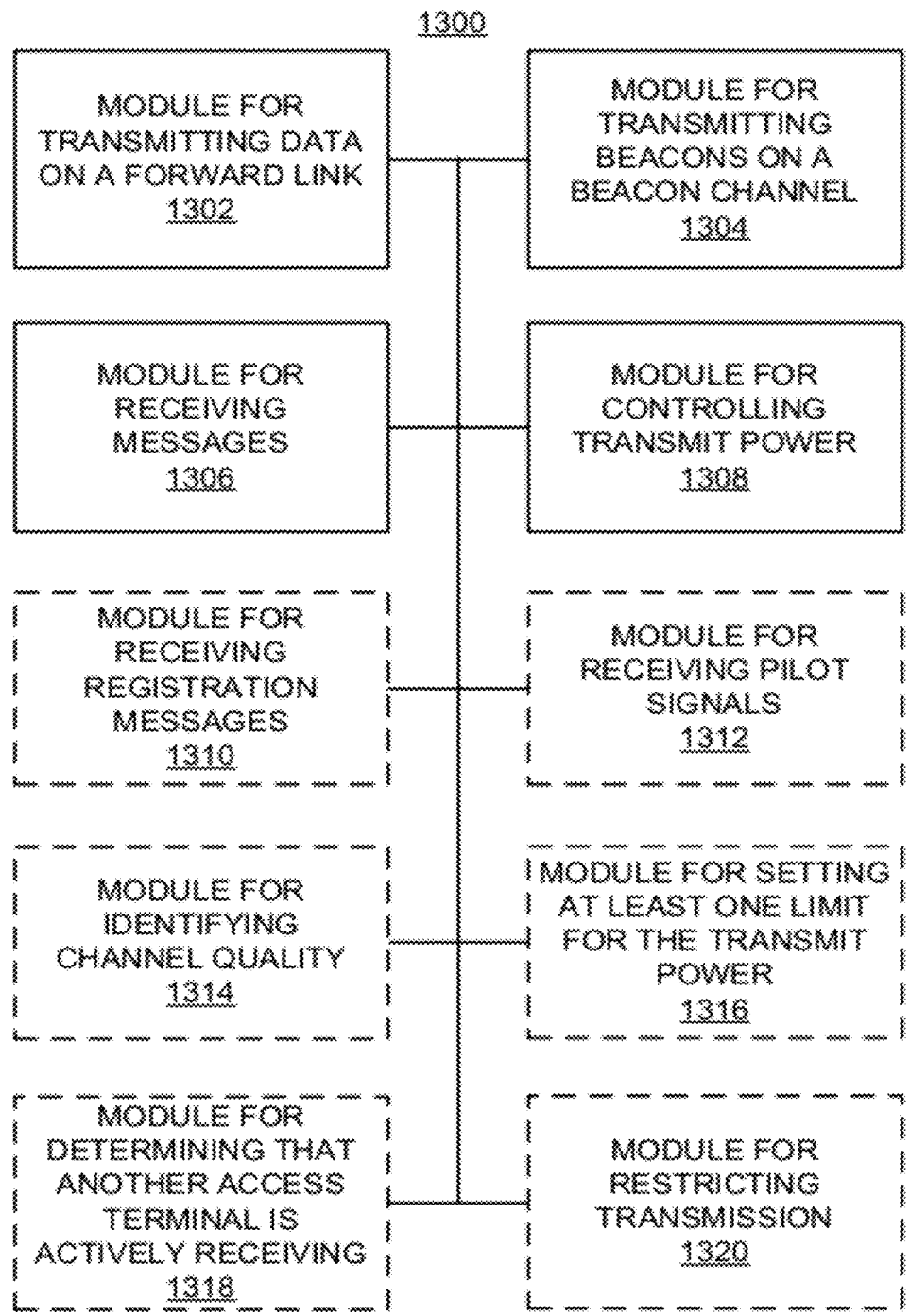
FIGS. 13-17 are simplified block diagrams of several sample aspects of apparatuses configured to control transmit power as taught herein.
Figure 14:
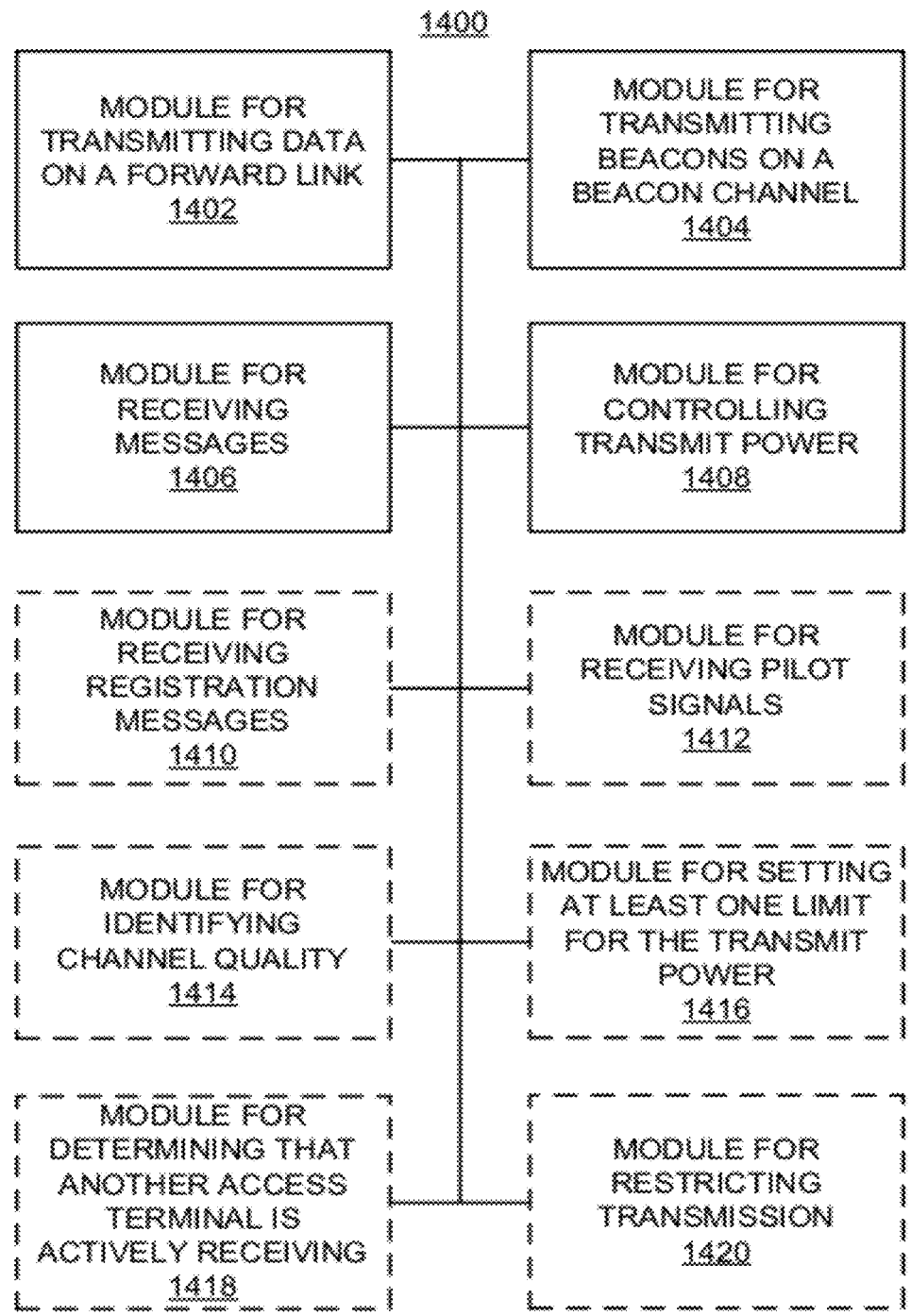
Figure 15:
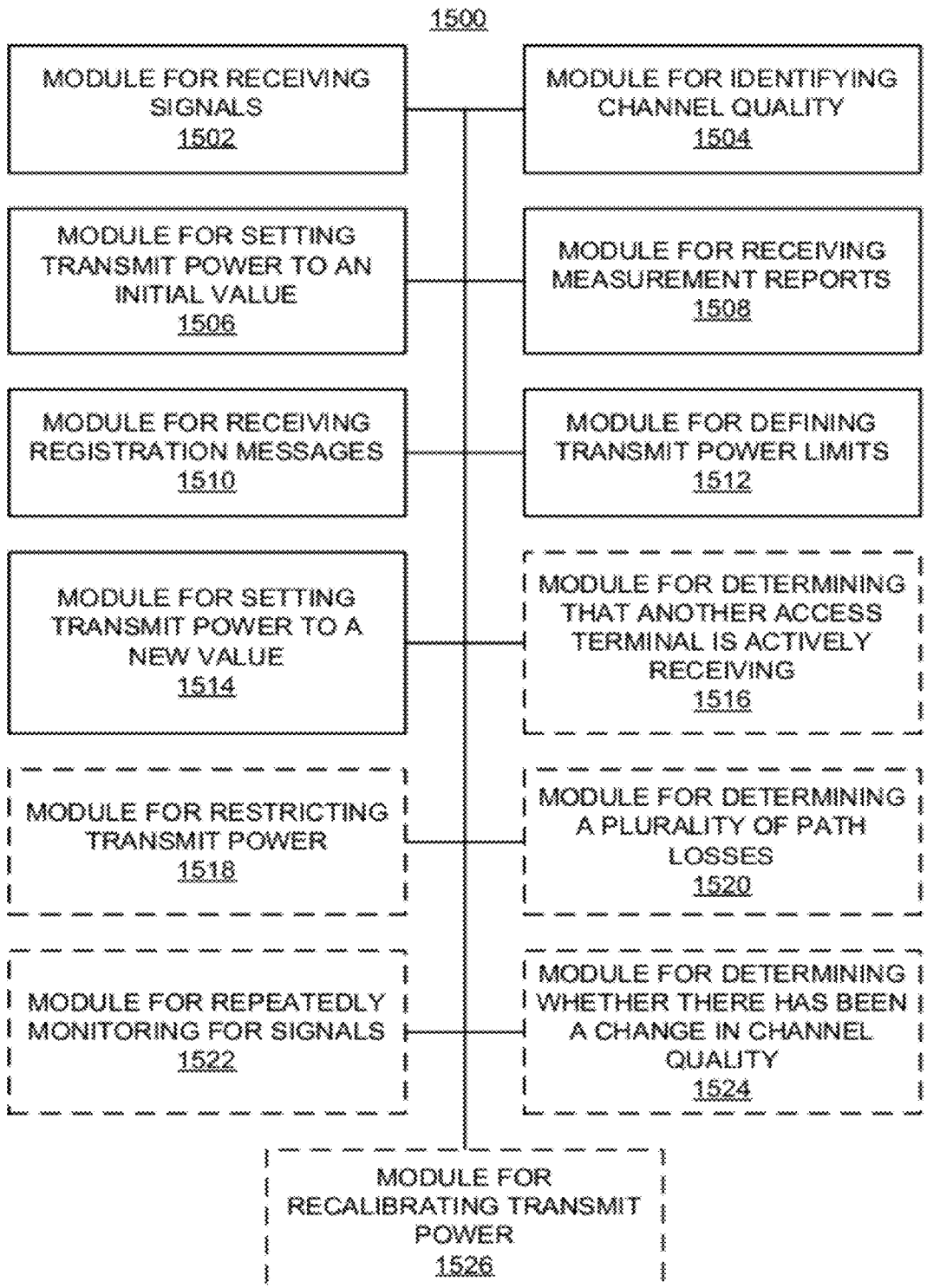
Figure 16:
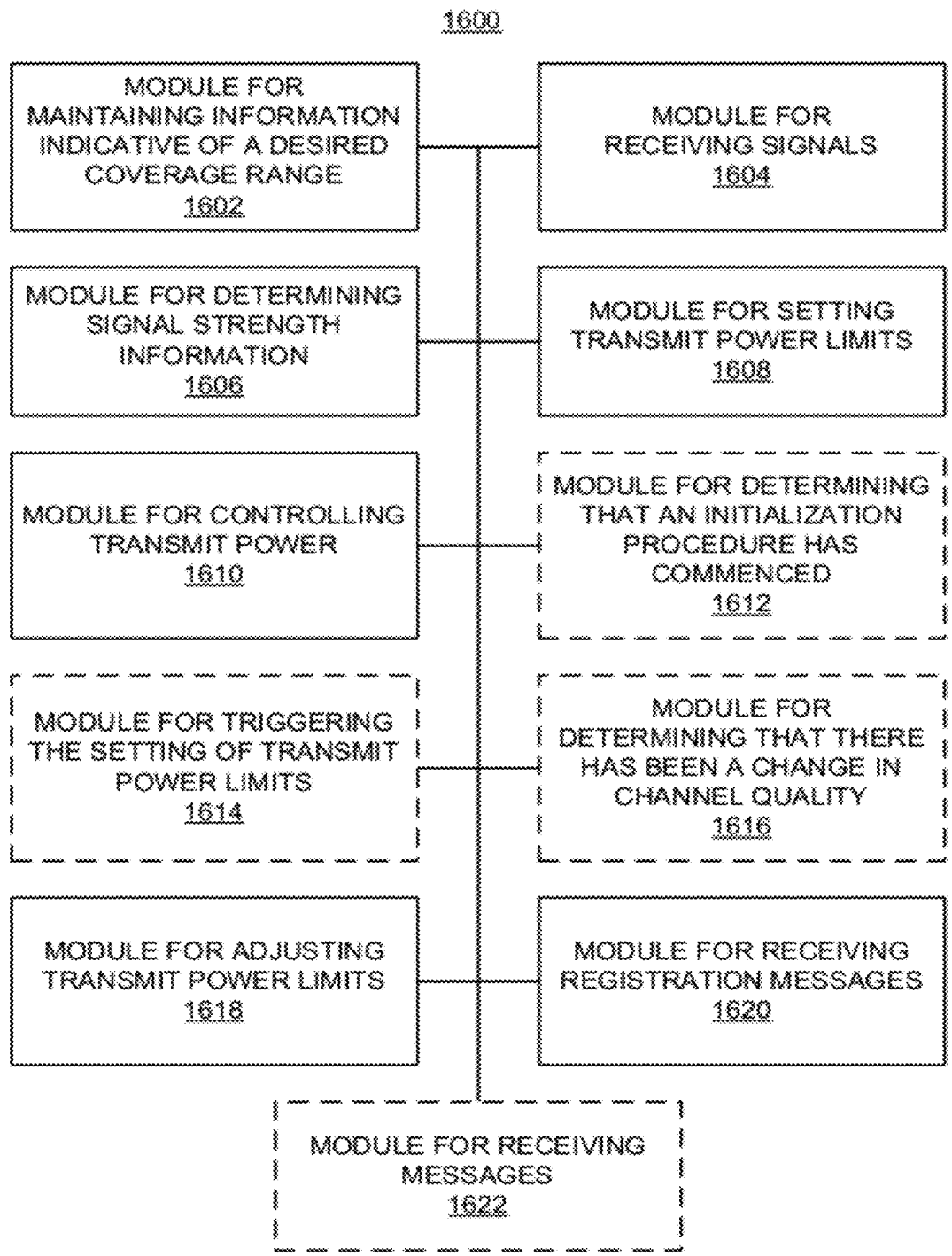
Figure 17:
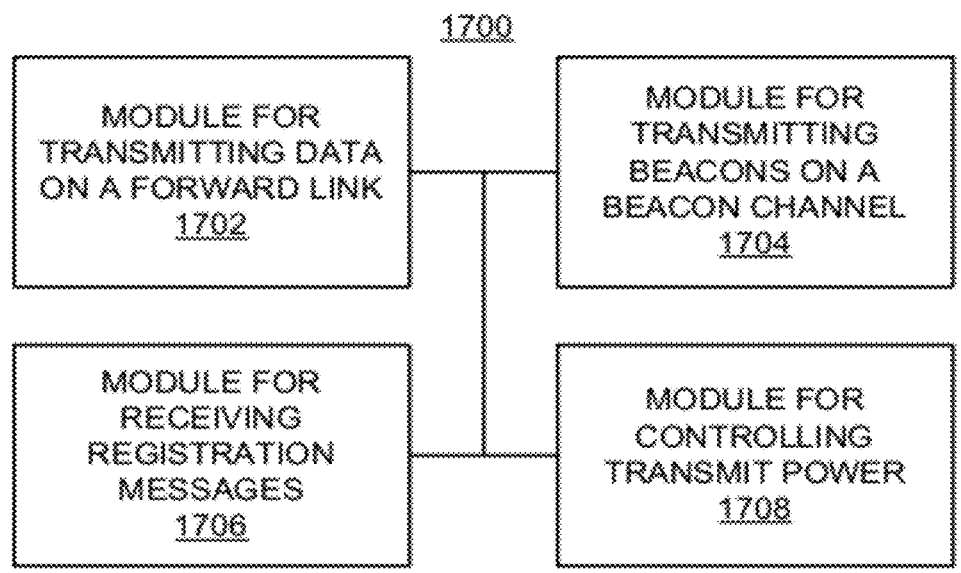

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform transmit power control operations as taught herein. For example, a transmit power control component 1290 may cooperate with the processor 1230 and/or other components of the device 1210 to control transmit power for transmissions by the device 1210 (e.g., transmissions to another device such as the device 1250) as taught herein. It should be appreciated that for each device 1210 and 1250 the functionality of two or more of the described components may be provided by a single component. For example, a single processing component may provide the functionality of the transmit power control component 1290 and the processor 1230.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 13-17, apparatuses 1300, 1400, 1500, 1600, and 1700 are represented as a series of interrelated functional modules. Here, a module for transmitting data on a forward link 1302 or 1402 may correspond at least in some aspects to, for example, a transmitter as discussed herein. A module for transmitting beacons on a beacon channel 1304 or 1404 may correspond at least in some aspects to, for example, a transmitter as discussed herein. A module for receiving messages 1306 or 1406 may correspond at least in some aspects to, for example, a receiver as discussed herein. A module for controlling transmit power 1308 or 1408 may correspond at least in some aspects to, for example, a controller as discussed herein. A module for receiving registration messages 1310 or 1410 may correspond at least in some aspects to, for example, a receiver as discussed herein. A module for receiving pilot signals 1312 or 1412 may correspond at least in some aspects to, for example, a receiver as discussed herein. A module for identifying channel quality 1314 or 1414 may correspond at least in some aspects to, for example, a controller as discussed herein. A module for setting at least one limit for the transmit power 1316 or 1416 may correspond at least in some aspects to, for example, a controller as discussed herein. A module for determining that another access terminal is actively receiving 1318 or 1418 may correspond at least in some aspects to, for example, a controller as discussed herein. A module for restricting transmission 1320 or 1420 may correspond at least in some aspects to, for example, a controller as discussed herein. A module for receiving signals 1502 may correspond at least in some aspects to, for example, a receiver as discussed herein. A module for identifying channel quality 1504 may correspond at least in some aspects to, for example, a controller as discussed herein. A module for setting transmit power to an initial value 1506 may correspond at least in some aspects to, for example, a controller as discussed herein. A module for receiving measurement reports 1508 may correspond at least in some aspects to, for example, a receiver as discussed herein. A module for receiving registration messages 1510 may correspond at least in some aspects to, for example, a receiver as discussed herein. A module for defining transmit power limits 1512 may correspond at least in some aspects to, for example, a controller as discussed herein. A module for setting transmit power to a new value 1514 may correspond at least in some aspects to, for example, a controller as discussed herein. A module for determining that another access terminal is actively receiving 1516 may correspond at least in some aspects to, for example, a controller as discussed herein. A module for restricting transmit power 1518 may correspond at least in some aspects to, for example, a controller as discussed herein. A module for determining a plurality of path losses 1520 may correspond at least in some aspects to, for example, a controller as discussed herein. A module for repeatedly monitoring signals 1522 may correspond at least in some aspects to, for example, a receiver as discussed herein. A module for determining whether there has been a change in transmit power 1524 may correspond at least in some aspects to, for example, a controller as discussed herein. A module for recalibrating transmit power 1526 may correspond at least in some aspects to, for example, a controller as discussed herein. A module for maintaining information indicative of a desired coverage range 1602 may correspond at least in some aspects to, for example, a controller as discussed herein. A module for receiving signals 1604 may correspond at least in some aspects to, for example, a receiver as discussed herein. A module for determining signal strength information 1606 may correspond at least in some aspects to, for example, a controller as discussed herein. A module for setting transmit power limits 1608 may correspond at least in some aspects to, for example, a controller as discussed herein. A module for controlling transmit power 1610 may correspond at least in some aspects to, for example, a controller as discussed herein. A module for determining that an initialization procedure has commenced 1612 may correspond at least in some aspects to, for example, a controller as discussed herein. A module for triggering the setting of transmit power limits 1614 may correspond at least in some aspects to, for example, a controller as discussed herein. A module for determining that there has been a change in channel quality 1616 may correspond at least in some aspects to, for example, a controller as discussed herein. A module for adjusting transmit power limits 1618 may correspond at least in some aspects to, for example, a controller as discussed herein. A module for receiving registration messages 1620 may correspond at least in some aspects to, for example, a receiver as discussed herein. A module for receiving messages 1622 may correspond at least in some aspects to, for example, a receiver as discussed herein. A module for transmitting data on a forward link 1702 may correspond at least in some aspects to, for example, a transmitter as discussed herein. A module for transmitting beacons on a beacon channel 1704 may correspond at least in some aspects to, for example, a transmitter as discussed herein. A module for receiving registration messages 1706 may correspond at least in some aspects to, for example, a receiver as discussed herein. A module for controlling transmit power 1708 may correspond at least in some aspects to, for example, a controller as discussed herein.

The functionality of the modules of FIGS. 13-17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-17 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving signals at an access point, wherein the signals are received from at least one other access point;
   identifying channel quality at the access point based on the received signals;
   setting transmit power of the access point to an initial value based on the identified channel quality and a defined coverage range;
   receiving registration messages at the access point, wherein the registration messages are received from at least one access terminal; and
   setting the transmit power to a new value based on the received registration messages.

2. The method of claim 1, wherein:
   the at least one other access point transmits on a macro carrier frequency that is different from a service channel carrier frequency for the access point; and
   the transmit power setting is used for beacon transmissions by the access point on the macro carrier frequency.

3. The method of claim 1, wherein:
   the at least one other access point transmits on a service channel carrier frequency for the access point; and
   the transmit power setting is used for transmissions by the access point on the service channel carrier frequency.

4. The method of claim 1, further comprising:
   determining that another access terminal near the access point is actively receiving information from one of the at least one other access point; and
   temporarily restricting the transmit power of the access point as a result of the determination.

5. The method of claim 1, further comprising:
   repeatedly monitoring for signals from the at least one other access point;
   determining whether there has been a change in channel quality at the access point based on the monitoring; and
   recalibrating the transmit power if there has been a change in the channel quality at the access point.

6. The method of claim 1, wherein:
   the registration messages are received over a period of time; and
   the setting of the transmit power to a new value based on the received registration messages comprises adjusting the transmit power upon expiration of the period of time.

7. The method of claim 1, wherein the setting of the transmit power to a new value based on the received registration messages comprises:
   classifying the at least one access terminal according to a set of defined access terminal types; and
   adjusting the transmit power based on the classification of the at least one access terminal.

8. The method of claim 7, wherein the classification of the at least one access terminal comprises determining whether the at least one access terminal is a neighboring alien access terminal or a non-neighboring alien access terminal.

9. The method of claim 7, wherein the classification of the at least one access terminal is based on at least one period of time that the at least one access terminal has camped on the access point.

10. The method of claim 7, wherein the classification of the at least one access terminal is based on a quantity of registration attempts that the at least one access terminal has made at the access point over a period of time.

11. The method of claim 1, wherein the settings of the transmit power to the initial value and the new value each comprise specifying different transmit power values for transmission of low power beacons and transmission of high power beacons.

12. The method of claim 1, further comprising:
   receiving measurement reports at the access point, wherein the measurement reports are received from at least one other access terminal that is authorized to receive active mode service via the access point, and wherein the measurement reports include channel quality information associated with transmissions by one or more of the at least one other access point; and
   defining transmit power limits based on the received measurement reports, wherein the new value is within the defined transmit power limits.

13. The method of claim 12, wherein:
   the measurement reports further include channel quality information associated with transmissions by the access point;
   the method further comprises determining a plurality of path losses between the access point and the at least one other access terminal based on the received channel quality information associated with the transmissions by the access point; and
   the defining of the transmit power limits is further based on the determined path losses and the channel quality information associated with the transmissions by the one or more of the at least one other access point.

14. The method of claim 12, wherein:
the measurement reports are received over a period of time; and
the defining of the transmit power limits based on the received measurement reports comprises setting the transmit power limits upon expiration of the period of time.

15. An apparatus for communication, comprising:
a receiver associated with an access point that is operable to receive signals from at least one other access point; and
a controller operable to identify channel quality at the apparatus based on the received signals, wherein:
the controller is further operable to set transmit power to an initial value based on the identified channel quality and a defined coverage range;
the receiver is further operable to receive registration messages from at least one access terminal; and
the controller is further operable to set the transmit power to a new value based on the received registration messages.

16. The apparatus of claim 15, wherein the controller is further operable to:
determine that another access terminal near the apparatus is actively receiving information from one of the at least one other access point; and
temporarily restrict the transmit power as a result of the determination.

17. The apparatus of claim 15, wherein:
the receiver is further operable to repeatedly monitor for signals from the at least one other access point;
the controller is further operable to determine whether there has been a change in the channel quality at the apparatus based on the monitoring; and
the controller is further operable to recalibrate the transmit power if there has been a change in the channel quality at the apparatus.

18. The apparatus of claim 15, wherein:
the registration messages are received over a period of time; and
the setting of the transmit power to a new value based on the received registration messages comprises adjusting the transmit power upon expiration of the period of time.

19. The apparatus of claim 15, wherein the setting of the transmit power to a new value based on the received registration messages comprises:
classifying the at least one access terminal according to a set of defined access terminal types; and
adjusting the transmit power based on the classification of the at least one access terminal.

20. The apparatus of claim 15, wherein:
the receiver is further operable to receive measurement reports from at least one other access terminal that is authorized to receive active mode service via the apparatus, the measurement reports include received signal strength information associated with transmissions by one or more of the at least one other access point;
the controller is further operable to define transmit power limits based on the received measurement reports; and
the new value is within the defined transmit power limits.

21. The apparatus of claim 20, wherein:
the measurement reports are received over a period of time; and
the defining of the transmit power limits based on the received measurement reports comprises setting the transmit power limits upon expiration of the period of time.

22. An apparatus for communication, comprising:
means for receiving, associated with an access point, wherein:
the means for receiving is operable to receive signals from at least one other access point, and
the means for receiving is further operable to receive registration messages from at least one access terminal;
means for identifying channel quality at the apparatus based on the received signals;
means for setting transmit power to an initial value based on the identified channel quality and a defined coverage range; and
means for setting the transmit power to a new value based on the received registration messages.

23. The apparatus of claim 22, further comprising:
means for determining that another access terminal near the apparatus is actively receiving information from one of the at least one other access point; and
means for temporarily restricting the transmit power as a result of the determination.

24. The apparatus of claim 22, further comprising:
means for repeatedly monitoring for signals from the at least one other access point;
means for determining whether there has been a change in channel quality at the apparatus based on the monitoring; and
means for recalibrating the transmit power if there has been a change in the channel quality at the apparatus.

25. The apparatus of claim 22, wherein:
the registration messages are received over a period of time; and
the setting of the transmit power to a new value based on the received registration messages comprises adjusting the transmit power upon expiration of the period of time.

26. The apparatus of claim 22, wherein the setting of the transmit power to a new value based on the received registration messages comprises:
classifying the at least one access terminal according to a set of defined access terminal types; and
adjusting the transmit power based on the classification of the at least one access terminal.

27. The apparatus of claim 22, wherein the means for receiving is further operable to receive measurement reports from at least one other access terminal that is authorized to receive active mode service via the apparatus, wherein the measurement reports include received signal strength information associated with transmissions by one or more of the at least one other access point; and further comprising means for defining transmit power limits based on the received measurement reports, wherein the new value is within the defined transmit power limits.

28. The apparatus of claim 27, wherein:
the measurement reports are received over a period of time; and
the defining of the transmit power limits based on the received measurement reports comprises setting the transmit power limits upon expiration of the period of time.

29. A non-transitory computer-readable medium, comprising code for causing a computer to:
receive signals at an access point, wherein the signals are received from at least one other access point;
identify channel quality at the access point based on the received signals;

set transmit power of the access point to an initial value based on the identified channel quality and a defined coverage range;
receive registration messages at the access point, wherein the registration messages are received from at least one access terminal; and
set the transmit power to a new value based on the received registration messages.

30. The computer-readable medium of claim 29, further comprising code for causing the computer to:
determine that another access terminal near the access point is actively receiving information from one of the at least one other access point; and
temporarily restrict the transmit power of the access point as a result of the determination.

31. The computer-readable medium of claim 29, further comprising code for causing the computer to:
repeatedly monitor for signals from the at least one other access point;
determine whether there has been a change in the channel quality at the access point based on the monitoring; and
recalibrate the transmit power if there has been a change the channel quality at the access point.

32. The computer-readable medium of claim 29, wherein:
the registration messages are received over a period of time; and
the setting of the transmit power to a new value based on the received registration messages comprises adjusting the transmit power upon expiration of the period of time.

33. The computer-readable medium of claim 29, wherein the setting of the transmit power to a new value based on the received registration messages comprises:
classifying the at least one access terminal according to a set of defined access terminal types; and
adjusting the transmit power based on the classification of the at least one access terminal.

34. The computer-readable medium of claim 29, further comprising code for causing the computer to:
receive measurement reports at the access point, wherein the measurement reports are received from at least one other access terminal that is authorized to receive active mode service via the access point, and wherein the measurement reports include received signal strength information associated with transmissions by one or more of the at least one other access point; and
define transmit power limits based on the received measurement reports, wherein the new value is within the defined transmit power limits.

35. The computer-readable medium of claim 34, wherein:
the measurement reports are received over a period of time; and
the defining of the transmit power limits based on the received measurement reports comprises setting the transmit power limits upon expiration of the period of time.

\* \* \* \* \*